United States Patent
Zuber et al.

(10) Patent No.: US 10,496,187 B2
(45) Date of Patent: Dec. 3, 2019

(54) DOMED ORIENTATIONLESS INPUT ASSEMBLY FOR CONTROLLING AN ELECTRONIC DEVICE

(71) Applicant: Apple Inc., Cupertino, CA (US)

(72) Inventors: Wesley W. Zuber, Mountain View, CA (US); Jacob L. Matlick, San Francisco, CA (US); Brian Q. Huppi, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/714,348

(22) Filed: Sep. 25, 2017

(65) Prior Publication Data

US 2018/0088686 A1    Mar. 29, 2018

Related U.S. Application Data

(60) Provisional application No. 62/398,939, filed on Sep. 23, 2016.

(51) Int. Cl.
| | | |
|---|---|---|
| *G06F 3/0346* | (2013.01) | |
| *G06F 3/038* | (2013.01) | |
| *G06F 3/0354* | (2013.01) | |
| *G06F 3/0488* | (2013.01) | |

(52) U.S. Cl.
CPC ............ *G06F 3/0346* (2013.01); *G06F 3/038* (2013.01); *G06F 3/0383* (2013.01); *G06F 3/03543* (2013.01); *G06F 3/03544* (2013.01); *G06F 3/03547* (2013.01); *G06F 3/04883* (2013.01)

(58) Field of Classification Search
CPC ...... G06F 3/033; G06F 3/0338; G06F 3/0346; G06F 3/03543; G06F 3/03544; G06F 3/03547; G06F 3/038; G06F 3/0383; G06F 3/04883

See application file for complete search history.

(56) References Cited

U.S. PATENT DOCUMENTS

| | | | |
|---|---|---|---|
| D247,746 S * | 4/1978 | Hall | D13/168 |
| 6,597,347 B1 * | 7/2003 | Yasutake | G06F 3/0338 345/173 |
| 7,233,318 B1 * | 6/2007 | Farag | G06F 3/03543 345/163 |
| 7,755,605 B2 * | 7/2010 | Daniel | G06F 1/1601 345/156 |
| 7,808,479 B1 * | 10/2010 | Hotelling | G06F 21/32 345/163 |
| 8,077,147 B2 * | 12/2011 | Krah | G06F 3/016 345/163 |
| 8,314,773 B2 * | 11/2012 | Low | G06F 3/0317 345/166 |
| 8,698,748 B2 * | 4/2014 | Tang | G06F 3/03543 345/163 |
| 8,823,645 B2 * | 9/2014 | Kryze | G06F 1/266 345/158 |
| 9,152,236 B2 * | 10/2015 | Kryze | G06F 1/266 |

(Continued)

FOREIGN PATENT DOCUMENTS

JP    11-134093    5/1999

*Primary Examiner* — Michael J Jansen, II
(74) *Attorney, Agent, or Firm* — Van Court & Aldridge LLP

(57) ABSTRACT

Domed input assemblies for controlling an electronic device and methods for using domed input assemblies for controlling electronic device are provided.

17 Claims, 16 Drawing Sheets

(56) References Cited

U.S. PATENT DOCUMENTS

| Patent/Publication No. | Date | Inventor | Classification |
|---|---|---|---|
| 9,176,602 B2 * | 11/2015 | Sesto | G08C 17/02 |
| 10,198,172 B2 * | 2/2019 | Choi | G06F 3/0488 |
| 2007/0080945 A1 * | 4/2007 | Huppi | G06F 3/03543, 345/163 |
| 2007/0152966 A1 * | 7/2007 | Krah | G06F 3/016, 345/163 |
| 2007/0247439 A1 * | 10/2007 | Daniel | G06F 1/1601, 345/173 |
| 2008/0150898 A1 * | 6/2008 | Low | G06F 3/0317, 345/166 |
| 2008/0297478 A1 * | 12/2008 | Hotelling | G06F 21/32, 345/163 |
| 2010/0201626 A1 * | 8/2010 | Krah | G06F 3/03543, 345/163 |
| 2010/0295787 A1 * | 11/2010 | Tang | G06F 3/03543, 345/166 |
| 2012/0068927 A1 * | 3/2012 | Poston | G06F 3/0317, 345/163 |
| 2012/0075255 A1 * | 3/2012 | Krah | G06F 3/016, 345/175 |
| 2012/0162073 A1 * | 6/2012 | Kryze | G06F 1/266, 345/158 |
| 2013/0063350 A1 * | 3/2013 | Takeda | A63F 13/211, 345/158 |
| 2013/0241894 A1 * | 9/2013 | Chapman | G06F 3/0346, 345/177 |
| 2013/0307676 A1 * | 11/2013 | Raynor | G08C 17/02, 340/12.22 |
| 2014/0062892 A1 * | 3/2014 | Dickinson | G06F 3/0412, 345/173 |
| 2014/0292689 A1 * | 10/2014 | Akatsuka | G06F 3/03547, 345/173 |
| 2014/0333562 A1 * | 11/2014 | Kryze | G06F 1/266, 345/173 |
| 2014/0362025 A1 * | 12/2014 | Sesto | G08C 17/02, 345/174 |
| 2015/0070278 A1 * | 3/2015 | Rehn | G06F 3/03543, 345/163 |
| 2015/0169080 A1 * | 6/2015 | Choi | G06F 3/041, 345/174 |
| 2016/0188010 A1 * | 6/2016 | Wright | G06F 3/03543, 345/163 |
| 2016/0231819 A1 * | 8/2016 | Chavez | G06F 3/016 |
| 2017/0038905 A1 * | 2/2017 | Bijamov | G06F 3/0414 |
| 2018/0074639 A1 * | 3/2018 | Powell | G06F 3/044 |
| 2018/0088686 A1 * | 3/2018 | Zuber | G06F 3/0383 |

* cited by examiner

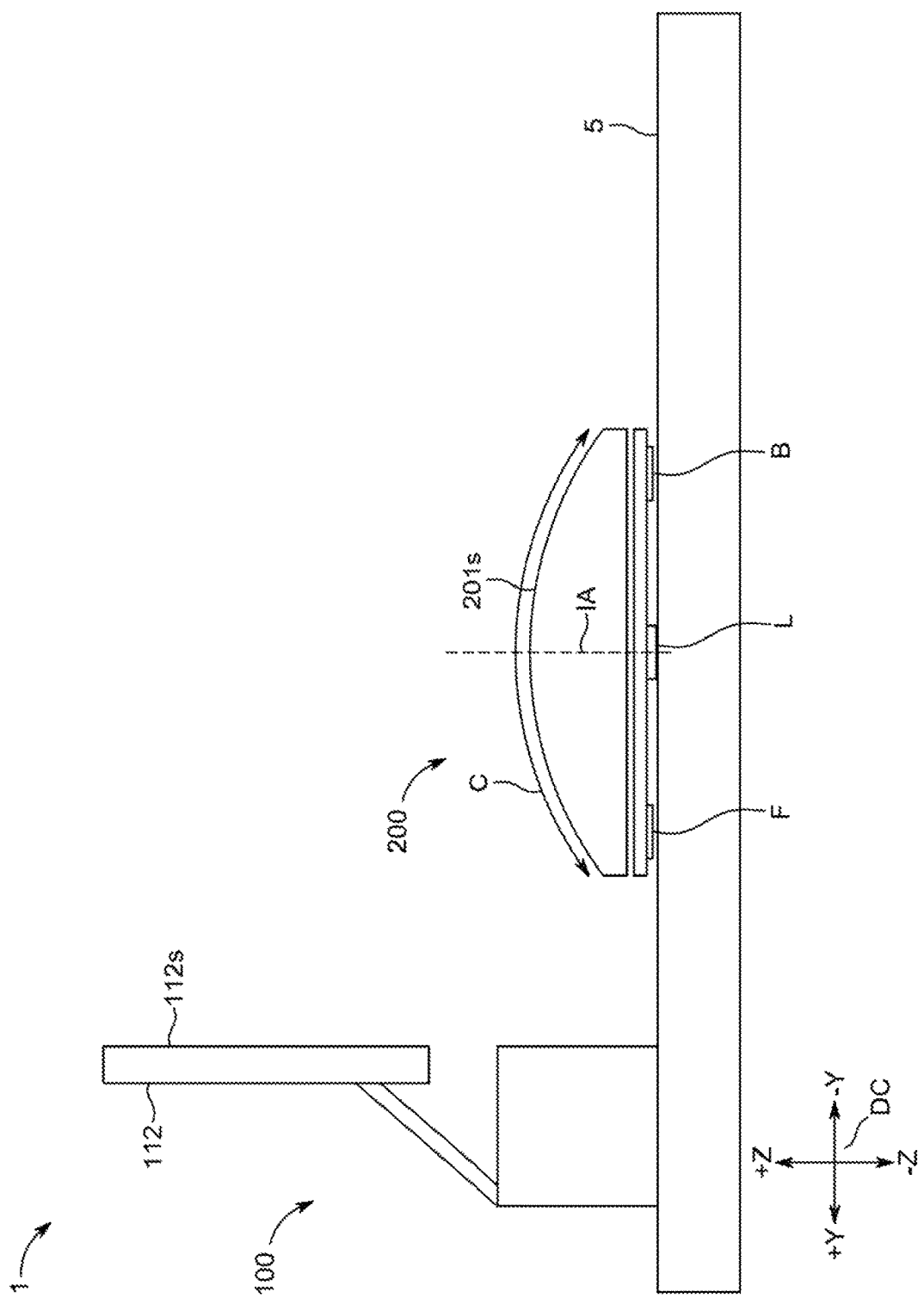

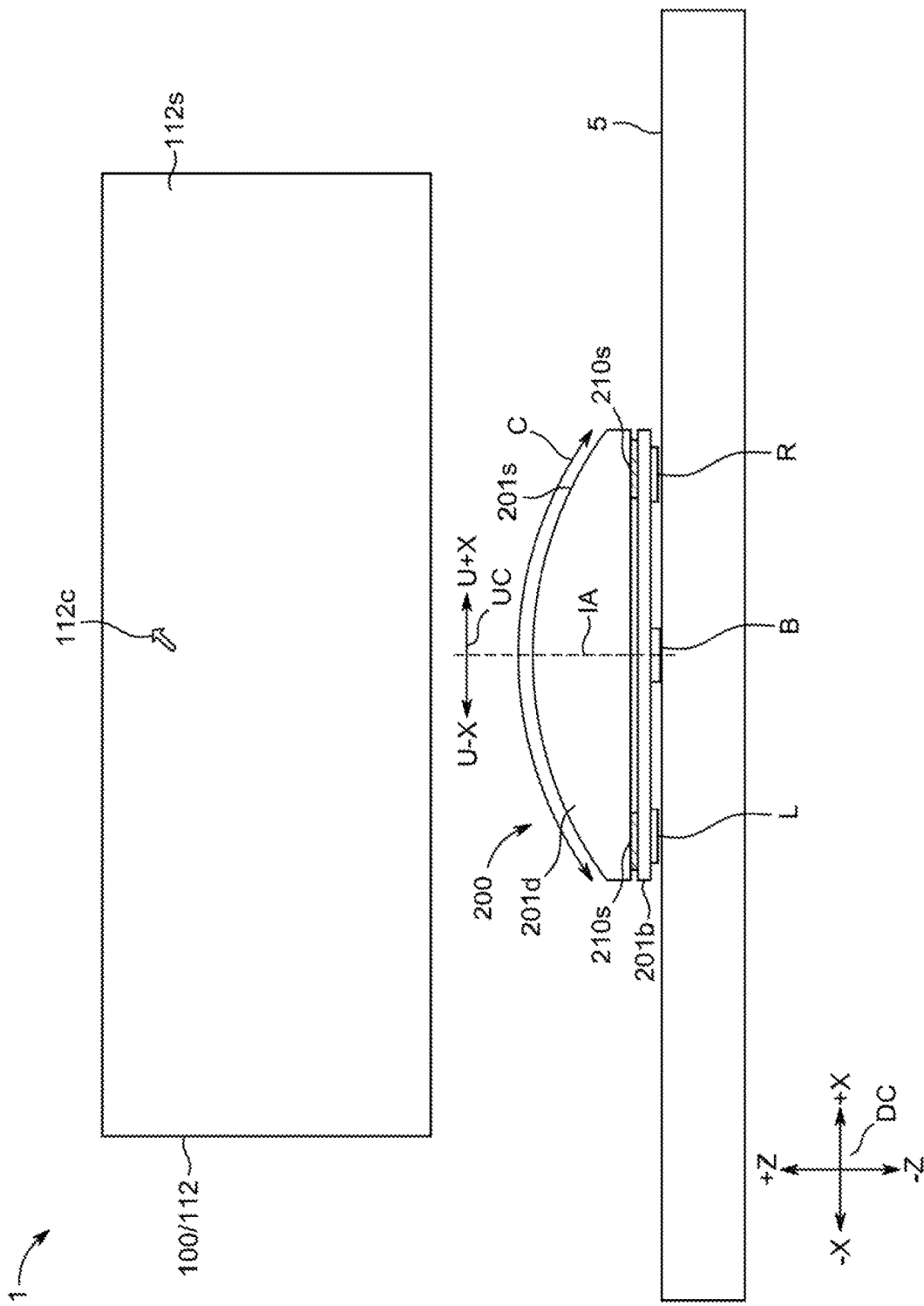

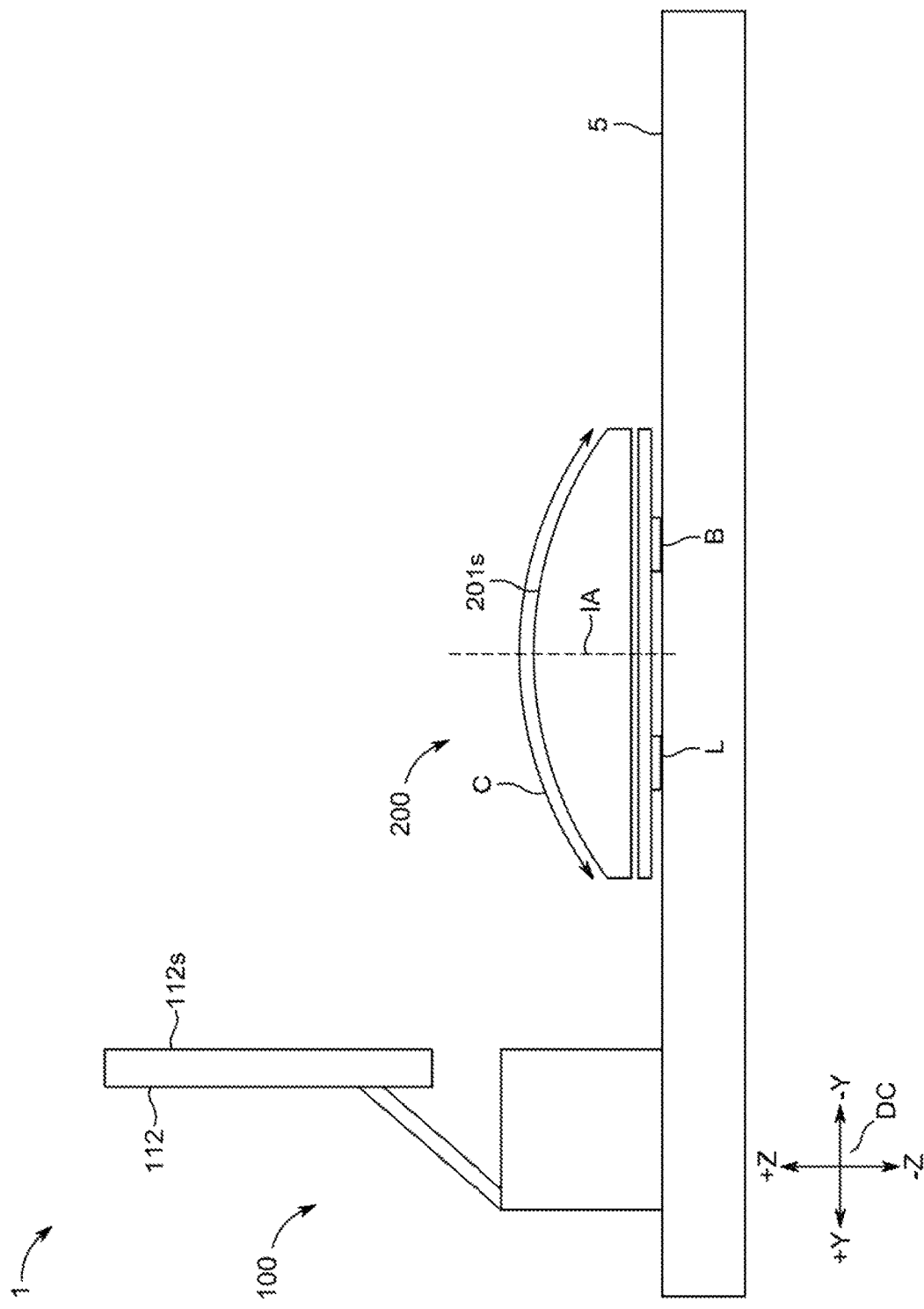

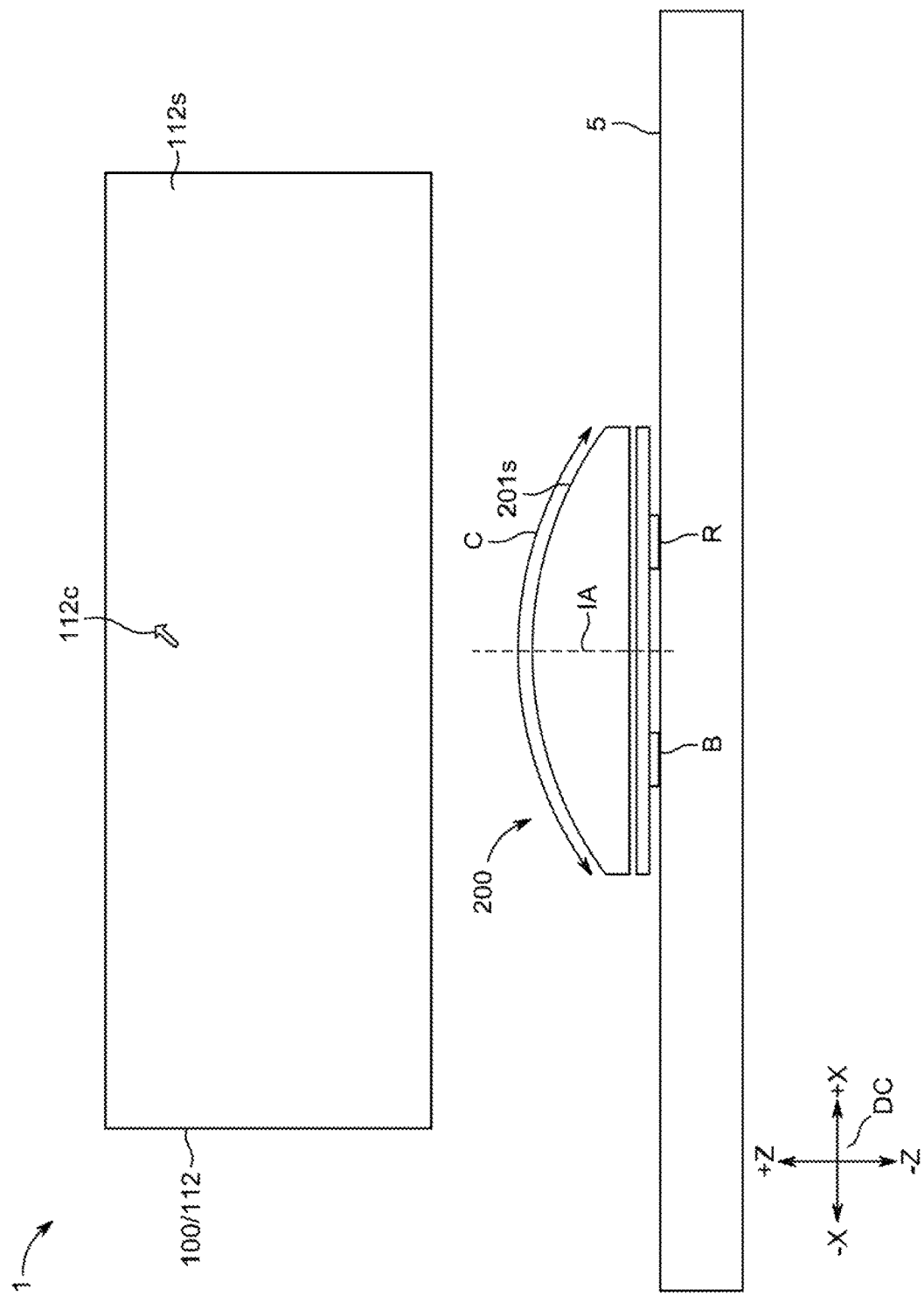

US 10,496,187 B2

DOMED ORIENTATIONLESS INPUT ASSEMBLY FOR CONTROLLING AN ELECTRONIC DEVICE

CROSS-REFERENCE TO RELATED APPLICATION(S)

This application claims the benefit of prior filed U.S. Provisional Patent Application No. 62/398,939, filed Sep. 23, 2016, which is hereby incorporated by reference herein in its entirety.

FIELD

This generally relates to an input assembly for controlling an electronic device and, more particularly, to a domed orientationless and/or ambidextrous input assembly for controlling an electronic device.

BACKGROUND

Some systems may include an electronic device with a display assembly operative to present a graphical user interface, as well as an electronic input assembly that may be manipulated by a user for generating user control signals operative to adjust the graphical user interface. However, existing systems often limit the ways by which a user may interact with an input assembly to generate particular user control signals.

SUMMARY

Domed input assemblies for controlling an electronic device and methods for using domed input assemblies for controlling an electronic device are provided.

As an example, an input assembly is provided for controlling an electronic device, where the input assembly may include a housing structure providing an orientationless surface with respect to at least one axis of an input coordinate system of the input assembly, a sensor subassembly at least partially protected by the housing structure, and processor operative to detect, with the sensor subassembly, a user coordinate system of a user with respect to the orientationless surface, detect, with the sensor subassembly, a physical use of the housing structure, and determine a control action for the electronic device based on the user coordinate system and the physical use.

As another example, a method is provided for controlling an electronic device using an input assembly of a user, where the method may include detecting a user interface event that includes the user interfacing with the input assembly, after the detecting the user interface event, defining a user coordinate system for the detected user interface event from a plurality of possible user coordinate systems, after the defining the user coordinate system, detecting a physical use of the input assembly, and, based on both the defined user coordinate system and the detected physical use, determining control data that is operative to control the electronic device.

As yet another example, an input assembly is provided for controlling an electronic device, where the input assembly may include a housing structure providing a surface within an input coordinate system of the input assembly, a sensor subassembly at least partially protected by the housing structure, and a processor operative to detect, with the sensor subassembly, a user coordinate system of a user with respect to the surface from at least three possible user coordinate systems, wherein each one of the at least three possible user coordinate systems has a different orientation with respect to the input coordinate system of the input assembly, detect, with the sensor subassembly, a physical use of the housing structure, and determine a control action for the electronic device based on the user coordinate system and the physical use.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which:

FIG. 1A is a left side view of an exemplary input assembly interacting in a first assembly orientation with an exemplary electronic device of the system of FIG. 1;

FIG. 1G is a front side view of the system of FIGS. 1-1F taken from line 1G-1G of FIG. 1D but without the user shown;

FIG. 2A is a left side view of the system of FIGS. 1-1H with the input assembly interacting in a second assembly orientation with the electronic device;

FIG. 2B is a front side view of the system of FIGS. 1-2A with the input assembly interacting in the second assembly orientation with the electronic device;

DETAILED DESCRIPTION

In the following detailed description, for purposes of explanation, numerous specific details are set forth to provide a thorough understanding of the various embodiments described herein. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art will readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming, but would nevertheless be a routine engineering undertaking for those of ordinary skill in the art having the benefit of this disclosure.

The present disclosure relates to input assemblies (e.g., domed orientationless and/or ambidextrous input assemblies) for controlling an electronic device and methods for using input assemblies for controlling an electronic device. Determination of a current user orientation with respect to an input assembly (e.g., determination of a current orientation of a user coordinate system of a user with respect to an input coordinate system of an input assembly) may be used to map particular user physical manipulations of the input assembly to particular types of control data for controlling an electronic device (e.g., for controlling a cursor on a screen of the electronic device). This may enable consistent control data to be generated in response to a particular user physical gesture imparted by a user on an input assembly no matter the orientation of the user to input assembly and/or the orientation of the input assembly to the electronic device and/or the orientation of the user to the electronic device.

Domed input assemblies for controlling an electronic device and methods for using domed input assemblies for controlling an electronic device are provided and described with reference to FIGS. 1-3.

Figure 1:
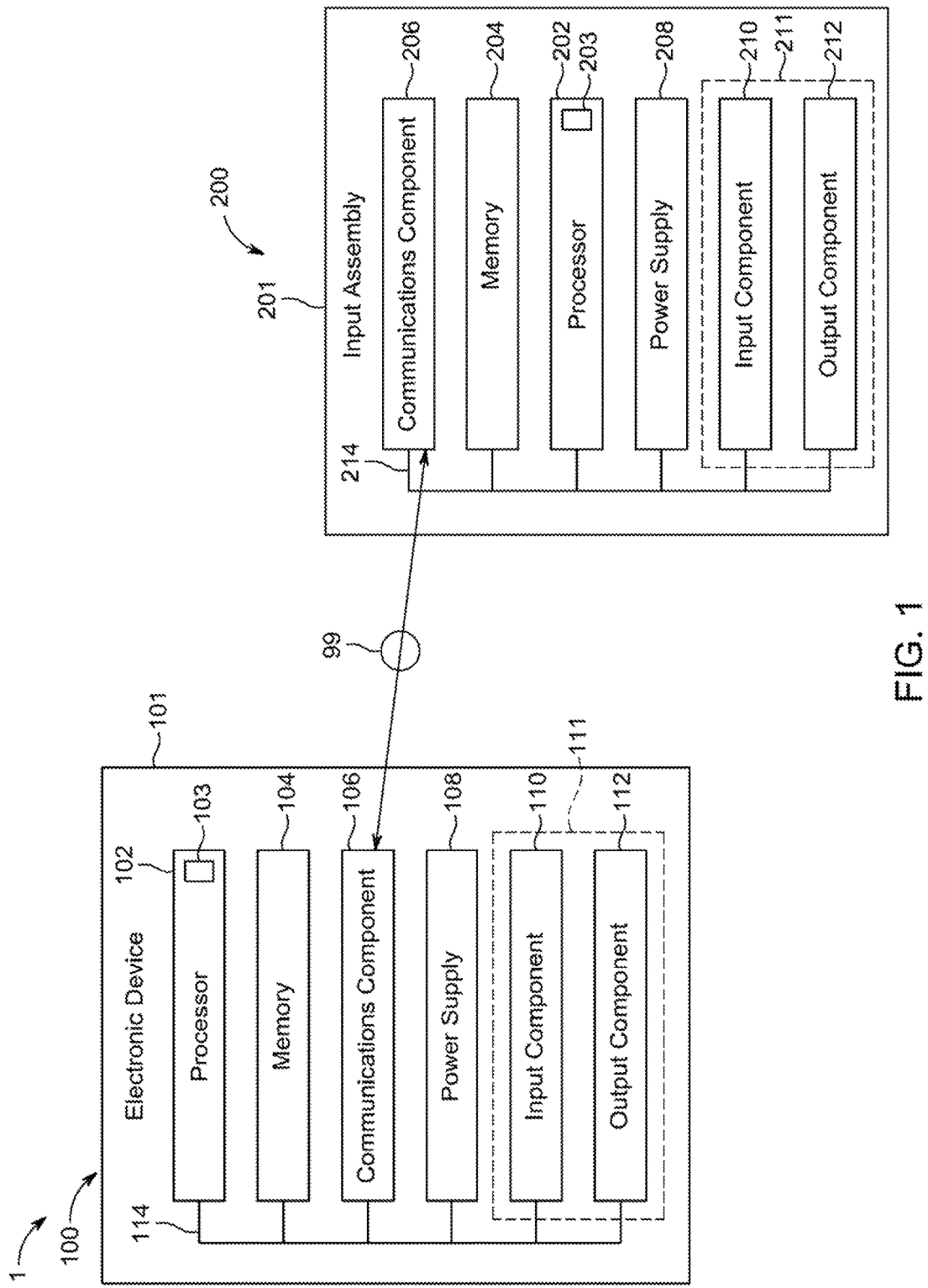
FIG. 1 is a schematic view of an illustrative user input system including an electronic device and an electronic input assembly.

FIG. 1 is a schematic view of an illustrative system 1 with an electronic device 100 and an electronic input assembly 200. Input assembly 200 (e.g., a mouse, a trackpad, user-manipulated electronic input device, hand-held input device, and the like) may be configured to provide input to electronic device 100 (e.g., a tablet computer, laptop computer, desktop computer, and the like), such as for controlling a user interface presented by the electronic device. A system user (e.g., user U of FIGS. 1D-1F) may slide, rotate, squeeze, press, touch, or otherwise physically manipulate input assembly 200 in any suitable manner relative to electronic device 100 to convey information to electronic device 100 for controlling electronic device 100 in any suitable manner, such as for controlling or otherwise interacting with a user interface presented by electronic device 100. In many embodiments, the user interface presented by electronic device 100 may be a graphical or otherwise visual user interface that may be presented by a display output component of electronic device 100. However, in other embodiments, the user interface presented by electronic device 100 may be an at least partially non-visual user interface that may instead provide audible and/or tactile information to the user. Collectively, input assembly 200 and electronic device 100 may be referred to herein as a "user input" system 1.

Broadly and generally, system 1 may be operative to determine and/or estimate a current user orientation of at least one body part of user U (e.g., a palm, wrist, set of fingers, etc.) with respect to at least one physical feature of input assembly 200 as well as to detect a current physical manipulation of input assembly 200 by user U. System 1 may also be operative to use both the determined user orientation and the detected physical manipulation to define at least one particular control command for controlling electronic device 100 (e.g., for controlling a user interface presented by electronic device 100). System 1 may be operative to determine three or more particular user orientations of user U with respect to input assembly 200, such as to determine that a current user orientation is a particular one of at least three possible user orientations that may be detectable by system 1. In some embodiments, system 1 may be configured to detect any greater number of possible user orientations, such as 30, 60, 90, 120, 180, 240, 270, 360, 480, 540, 720, and/or any other suitable possible user orientations with respect to input assembly (e.g., any degree orientation of 360 degree orientations of user U's left hand with respect to input assembly 200 and any degree orientation of 360 degree orientations of user U's right hand with respect to input assembly 200). Moreover, system 1 may be operative to detect any suitable number of types of physical manipulation by user U of input assembly 200, such as any planar movement of the entirety of input assembly 200 in a plane (e.g., along a work surface), any planar movement of a portion of input assembly 200 with respect to another portion of input assembly 200, any rotational movement of a portion of input assembly 200 with respect to another portion of input assembly 200, any touch gestures along a surface of input assembly 200, and/or the like. A shape of at least an external portion of input assembly 200 may be a dome or other suitable shape that may be operative to present a similar external surface to user U no matter which of three or more user orientations user U may have with respect to that external surface, such that user U may more easily orient itself with respect to input assembly 200 no matter the position of user U with respect to input assembly 200 (e.g., as compared to an input assembly shaped to provide only one or two comfortable orientations with respect to the user). Therefore, system 1 may be configured to enable user U to control electronic device 100 in a similar fashion using the same physical manipulation of input assembly 200 no matter which one of three or more user orientations user U may have with respect to input assembly 200.

Electronic device 100 may be any portable, mobile, or hand-held electronic device configured to receive control signals from input assembly 200 for controlling a user interface of electronic device 100. Alternatively, electronic device 100 may not be portable at all, but may instead be generally stationary. Electronic device 100 can include, but is not limited to, a media player, video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet, server, etc.), monitor, television, stereo equipment, set up box, set-top box, wearable device (e.g., an Apple Watch™ by Apple Inc.), boom box, modem, router, printer, and combinations thereof. Electronic device 100 may include any suitable control circuitry or processor 102, memory 104, communications component 106, power supply 108, input component 110, and output component 112. Electronic device 100 may also include a bus 114 that may provide one or more wired or wireless communication links or paths for transferring data and/or power to, from, or between various other components of device 100. Device 100 may also be provided with a housing 101 that may at least partially enclose one or more of the components of device 100 for protection from debris and other degrading forces external to device 100. In some embodiments, one or more of the components may be provided within its own housing (e.g., output component 112 may be an independent display within its own housing that may wirelessly or through a wire communicate with processor 102, which may be provided within its own housing). In some embodiments, one or more components of electronic device 100 may be combined or omitted. Moreover, electronic device 100 may include other components not combined or included in FIG. 1. For example, device 100 may include any other suitable components or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music and image files), software (e.g., applications for implementing functions on device 100 (e.g., virtual drawing space or other user interface applications)), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications component 106 may be provided to allow device 100 to communicate with one or more other electronic devices or servers or subsystems (e.g., input assembly 200) using any suitable communications protocol(s). For example, communications component 106 may support Wi-Fi (e.g., an 802.11 protocol), Ethernet, Bluetooth™, near field communication ("NFC"), radio-frequency identification ("RFID"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. Communications component 106 may also include circuitry that can enable device 100 to be electrically coupled to another device or server or subsystem (e.g., input assembly 200) and communicate with that other device, either wirelessly or via a wired connection.

Power supply 108 may provide power to one or more of the components of device 100. In some embodiments, power supply 108 can be coupled to a power grid (e.g., when device 100 is not a portable device, such as a desktop computer). In some embodiments, power supply 108 can include one or more batteries for providing power (e.g., when device 100 is a portable device, such as a cellular telephone). As another example, power supply 108 can be configured to generate power from a natural source (e.g., solar power using solar cells).

One or more input components 110 may be provided to permit a user to interact or interface with device 100 and/or to sense certain information about the ambient environment. For example, input component 110 can take a variety of forms, including, but not limited to, a touch pad, trackpad, dial, click wheel, scroll wheel, touch screen, one or more buttons (e.g., a keyboard), mouse, joy stick, track ball, switch, photocell, force-sensing resistor ("FSR"), encoder (e.g., rotary encoder and/or shaft encoder that may convert an angular position or motion of a shaft or axle to an analog or digital code), microphone, camera, scanner (e.g., a barcode scanner or any other suitable scanner that may obtain product identifying information from a code, such as a linear barcode, a matrix barcode (e.g., a quick response ("QR") code), or the like), proximity sensor (e.g., capacitive proximity sensor), biometric sensor (e.g., a fingerprint reader or other feature recognition sensor, which may operate in conjunction with a feature-processing application that may be accessible to electronic device 100 for authenticating or otherwise identifying or detecting a user), line-in connector for data and/or power, force sensor (e.g., any suitable capacitive sensors, pressure sensors, strain gauges, sensing plates (e.g., capacitive and/or strain sensing plates), etc.), temperature sensor (e.g., thermistor, thermocouple, thermometer, silicon bandgap temperature sensor, bimetal sensor, etc.) for detecting the temperature of a portion of electronic device 100 or an ambient environment thereof, a performance analyzer for detecting an application characteristic related to the current operation of one or more components of electronic device 100 (e.g., processor 102), motion sensor (e.g., single axis or multi axis accelerometers, angular rate or inertial sensors (e.g., optical gyroscopes, vibrating gyroscopes, gas rate gyroscopes, or ring gyroscopes), linear velocity sensors, and/or the like), magnetometer (e.g., scalar or vector magnetometer), pressure sensor, light sensor (e.g., ambient light sensor ("ALS"), infrared ("IR") sensor, etc.), touch sensor, hover (e.g., finger hover or near touch) sensor (e.g., one or more ultrasonic transducers or receivers and/or far field capacitive sensing and/or the like), thermal sensor, acoustic sensor, sonic or sonar sensor, radar sensor, image sensor, video sensor, global positioning system ("GPS") detector, radio frequency ("RF") detector, RF or acoustic Doppler detector, RF triangulation detector, electrical charge sensor, peripheral device detector, event counter, and any combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. An output component of electronic device 100 may take various forms, including, but not limited to, audio speakers, headphones, data and/or power line-outs, visual displays (e.g., for transmitting data via visible light and/or via invisible light), antennas, infrared ports, flashes (e.g., light sources for providing artificial light for illuminating an environment of the device), tactile/haptic outputs (e.g., rumblers, vibrators, etc.), taptic components (e.g., components that are operative to provide tactile sensations in the form of vibrations), and any combinations thereof.

For example, electronic device 100 may include a display as output component 112. Display 112 may include any suitable type of display or interface for presenting visual data to a user. In some embodiments, display 112 may include a display embedded in device 100 or coupled to device 100 (e.g., a removable display). Display 112 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, an organic electroluminescence display, electronic ink, or another type of display technology or combination of display technology types. Alternatively, display 112 can include a movable display or a projecting system for providing a display of content on a surface remote from electronic device 100, such as, for example, a video projector, a head-up display, or a three-dimensional (e.g., holographic) display. As another example, display 112 may include a digital or mechanical viewfinder, such as a viewfinder of the type found in compact digital cameras, reflex cameras, or any other suitable still or video camera. In some embodiments, display 112 may include display driver circuitry, circuitry for driving display drivers, or both. Display 112 can be operative to display content (e.g., media playback information, application screens for applications implemented on electronic device 100, information regarding ongoing communications operations, information regarding incoming communications requests, device operation screens, etc.) that may be under the direction of processor 102. Display 112 can be associated with any suitable characteristic dimensions defining the size and shape of the display. For example, the display can be rectangular or have any other polygonal shape, or alternatively can be defined by a curved or other non-polygonal shape (e.g., a circular display). Display 112 can have one or more primary orientations for which an interface can be displayed, or can instead or in addition be operative to display an interface along any orientation selected by a user.

It should be noted that one or more input components 110 and one or more output components 112 may sometimes be referred to collectively herein as an input/output ("I/O") component or I/O interface 111 (e.g., input component 110 and display 112 as I/O component or I/O interface 111). For example, input component 110 and display 112 may sometimes be a single I/O component 111, such as a touch screen, that may receive input information through a user's and/or stylus' touch of a display screen and that may also provide visual information to a user via that same display screen. Input component 110 of electronic device 100 may provide an input surface relative to which a system user may manipulate the orientation and position of stylus 400 to convey information to electronic device 100. In many embodiments, such an input surface of input component 110 of electronic device 100 may be provided as a portion of a multi-touch display screen assembly (e.g., as a portion of I/O interface 111 with a display output component 112). However, in other embodiments, such an input surface of input component 110 of electronic device 100 may be a non-display input surface, such as, but not limited to, a trackpad or drawing tablet, whether or not device 100 may also include a display output component.

Processor 102 of device 100 may include any processing circuitry operative to control the operations and performance of one or more components of electronic device 100. For example, processor 102 may be used to run one or more applications, such as an application 103. Application 103 may include, but is not limited to, one or more operating system applications, firmware applications, user interface applications, media playback applications, media editing applications, pass applications, calendar applications, state determination applications (e.g., device state determination applications, input assembly state determination applications, etc.), biometric feature-processing applications, compass applications, health applications, thermometer applications, weather applications, thermal management applications, force sensing applications, device diagnostic applications, video game applications, or any other suitable applications. For example, processor 102 may load application 103 as a user interface program or any other suitable program to determine how instructions or data received via an input component 110 and/or any other component of device 100 (e.g., input assembly data from input assembly 200 via communications component 106, etc.) may manipulate the one or more ways in which information may be stored on device 100 (e.g., in memory 104) and/or provided to a user via an output component 112 and/or to a remote subsystem (e.g., to input assembly 200 via communications component 106). Application 103 may be accessed by processor 102 from any suitable source, such as from memory 104 (e.g., via bus 114) or from another device or server (e.g., from input assembly 200 via communications component 106, and/or from any other suitable remote source via communications component 106). Electronic device 100 (e.g., processor 102, memory 104, or any other components available to device 100) may be configured to process graphical data at various resolutions, frequencies, intensities, and various other characteristics as may be appropriate for the capabilities and resources of device 100. Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes. Processor 102 may be implemented as any electronic device capable of processing, receiving, or transmitting data or instructions. For example, process 102 can be a microprocessor, a central processing unit, an application-specific integrated circuit, a field-programmable gate array, a digital signal processor, an analog circuit, a digital circuit, or combination of such devices. Processor 102 may be a single-thread or multi-thread processor. Processor 102 may be a single-core or multi-core processor. Accordingly, as described herein, the term "processor" may refer to a hardware-implemented data processing device or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

Input assembly 200 may be any suitable electronic user input tool, mouse, trackpad, user-manipulated electronic input device, hand-held input device, and/or the like that may be configured to provide control signals or other input to electronic device 100. Input assembly 200 may include any suitable control circuitry or processor 202, which may be similar to any suitable processor 102 of device 100, application 203, which may be similar to any suitable application 103 of device 100, memory 204, which may be similar to any suitable memory 104 of device 100, communications component 206, which may be similar to any suitable communications component 106 of device 100, power supply 208, which may be similar to any suitable power supply 108 of device 100, input component 210, which may be similar to any suitable input component 110 of device 100, output component 212, which may be similar to any suitable output component 112 of device 100, I/O interface 211, which may be similar to any suitable I/O interface 111 of device 100, bus 214, which may be similar to any suitable bus 114 of device 100, and/or housing 201, which may be similar to any suitable housing 101 of device 100. In some embodiments, one or more components of input assembly 200 may be combined or omitted. Moreover, input assembly 200 may include other components not combined or included in FIG. 1. For example, input assembly 200 may include any other suitable components or several instances of the components shown in FIG. 1. For the sake of simplicity, only one of each of the components is shown in FIG. 1. Input assembly 200 and electronic device 100 may be operative to communicate any suitable data 99 (e.g., control data signals) between communication components 206 and 106 using any suitable communication protocol(s).

FIGS. 1A-2F show input assembly 200 positioned on work surface 5. Input assembly 200 may be provided with a dome housing structure 201d positioned above a base housing structure 201b, while various components of input assembly 200 (e.g., processor 202, memory 204, communications component 206, one or more input components 210, one or more output components 212, and/or the like) may be at least partially positioned in a space between dome structure 201d and base structure 201b. Input assembly 200 may include one or more feet or pad elements extending downwardly from base structure 201b for contacting work surface 5 and/or for supporting the remainder of input assembly 200 thereabove. For example, as shown, input assembly 200 may include four feet F, R, B, and L that may be offset from one another and extending downwardly from different portions of base structure 201b for providing balanced support for input assembly 200 on work surface 5.

Figure 1B:
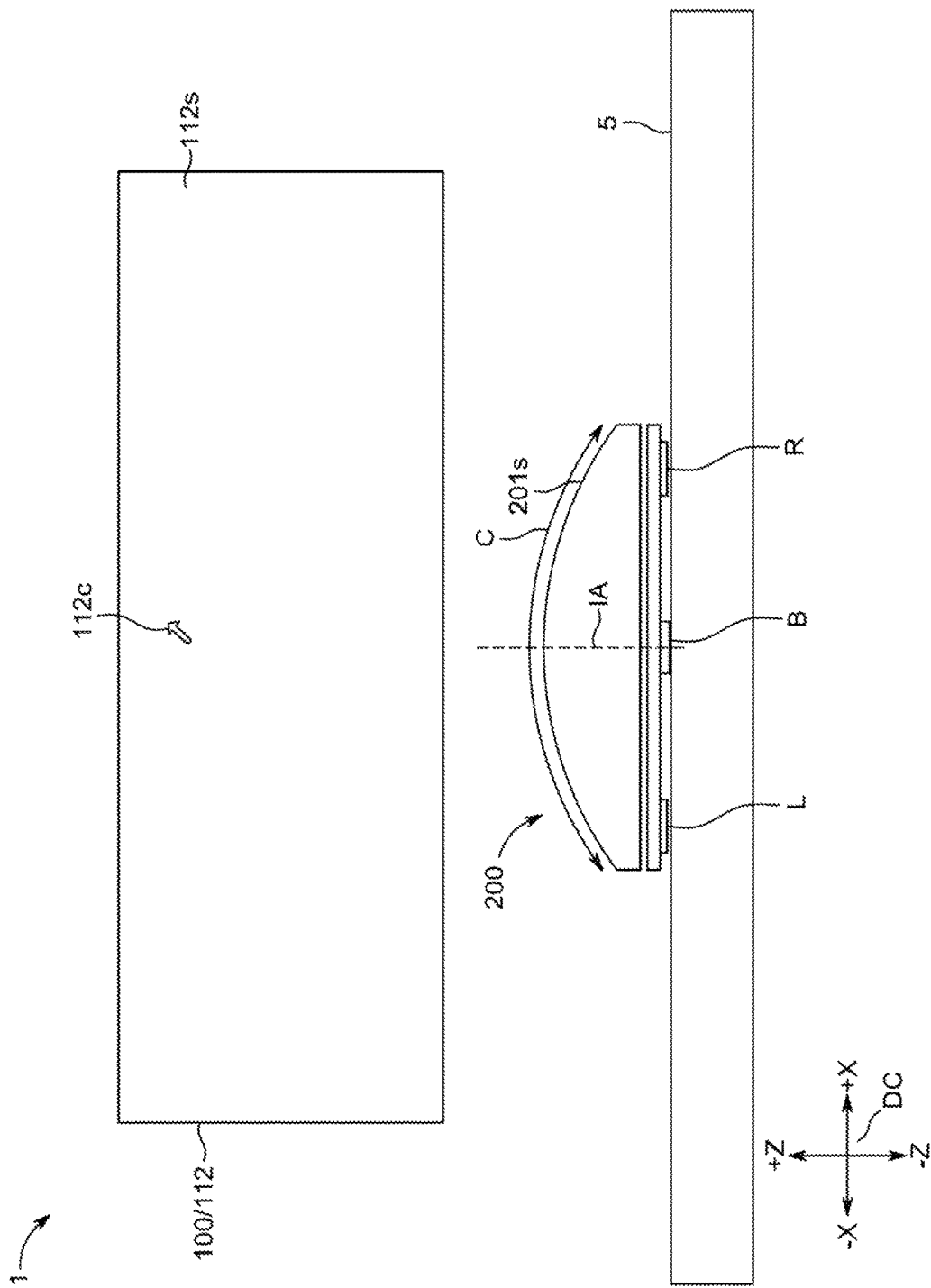
FIG. 1B is a front side view of the system of FIGS. 1 and 1A with the input assembly interacting in the first assembly orientation with the electronic device.
Figure 1C:
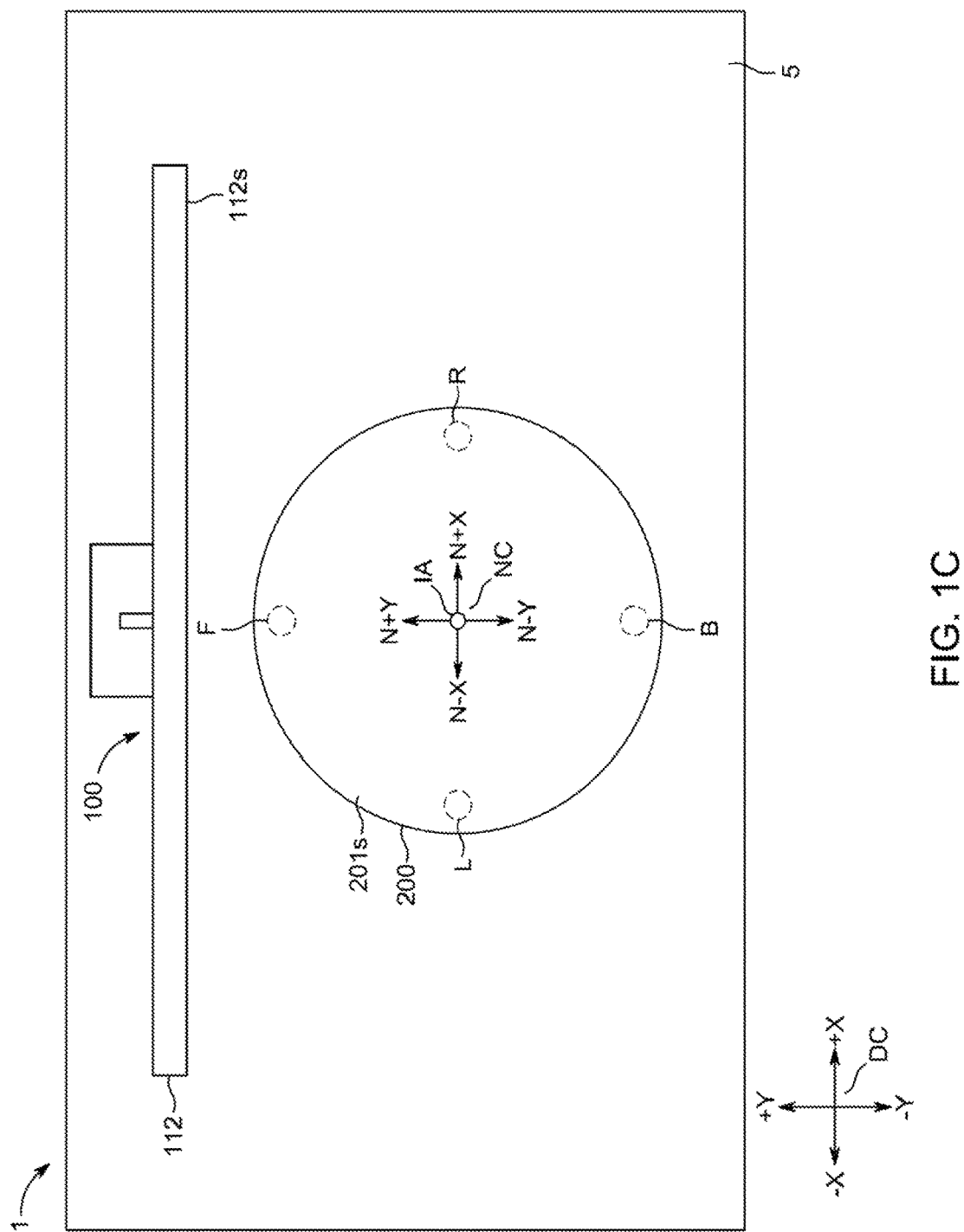
FIG. 1C is a top view of the system of FIGS. 1-1B with the input assembly interacting in the first assembly orientation with the electronic device.

Dome structure 201d may be any suitable shape, such as a spherical dome (e.g., a portion of a sphere cut off by a plane), a spheroidal dome (e.g., a section of a spheroid that provides a dome that is circularly symmetric (e.g., with an axis IA of rotation)), an ellipsoidal dome (e.g., a portion of an ellipsoid cut off by a plane normal to a symmetry axis IA of the ellipsoid), and/or the like, such that the shape of exterior surface 201s of dome structure 201d may be symmetrical about axis IA. For example, as shown in FIGS. 1A-1C, exterior surface 201s may be a symmetrical curved dome surface about axis IA (e.g., a dome structure of any suitable diameter (e.g., 6 inches to 8 inches or any other suitable range)). When no wires or structural markings are provided on housing 201 (e.g., on dome structure 201d and base structure 201b), input assembly 200 may provide a structure of a consistent shape when viewed from any line of sight perpendicular to axis IA (e.g., as shown by the similarities between FIGS. 1A and 1B that may provide the same curvature C of surface 201s). However, input assembly 200 may be described as having a particular assembly orientation, as various sensor input components 210 or other components of assembly 200 may be positioned within housing 201 in a particular orientation and/or calibrated with a particular orientation. Therefore, feet F, R, B, and L along with axis IA may be used herein to provide some context to a particular input assembly orientation or coordinate system. However, it is to be understood that, in some embodiments, such distinct feet may not exist or may not be visible to an end user (e.g., such feet may be hidden by a portion of base structure 201b that may extend about all such feet and contact or almost contact surface 5), whereby there may be no features visible to an end user operative to structurally and/or visually distinguish one orientation of assembly 200 from another orientation of assembly 200 with respect to surface 5 about an axis (e.g., axis IA). Alternatively, assembly 200 may be any other suitable shape that may not be symmetrical about axis IA (e.g., surface 201s may be rectangular and/or a cuboid or any other suitable two-dimensional or three-dimensional shape).

FIGS. 1A-2F depict input assembly 200 positioned on work surface 5 with a particular orientation with respect to at least one portion of electronic device 100. As shown, electronic device 100 may include a display output component 112 with a planar display screen 112s with an outer surface that may exist in an X-Z plane of an X-Y-Z three-dimensional Cartesian coordinate system DC (device coordinate system DC), while work surface 5 may exist in an X-Y plane of device coordinate system DC (although any other suitable relationship between surface 5 and screen 112s may exist). System 1 may be configured such that electronic device 100 may be displaying at least an input assembly controlled pointer or cursor 112c on display screen 112s that may be controlled by data 99 received from input assembly 200 based on user U interaction with input assembly 200.

Any suitable features of assembly 200 (e.g., feet F and B) may define an axis of an input coordinate system. For example, as shown, feet F and B may together define an axis that may be operative to define a Y-axis of an input coordinate system NC (e.g., between N−Y and N+Y), while axis IA may define a Z-axis of input coordinate system NC and an axis between feet L and R may define a X-axis of input coordinate system NC (e.g., between N−X and N+X). However, it is to be understood that any other suitable feature(s) and/or component(s) may be operative to define input coordinate system NC (e.g., any suitable axis/axes of any suitable sensing mechanism(s) of a sensor input component 210 of assembly 200). As shown in FIGS. 1A-1H, input assembly 200 and, thus, input coordinate system NC may be positioned in a first input orientation with respect to display screen 112s and, thus, with respect to device coordinate system DC. As shown in FIGS. 1A-1H, the first input orientation of assembly 200 with respect to device 100 may include input coordinate system NC of assembly 200 aligned with device coordinate system DC (e.g., axis X of input coordinate system NC is aligned with axis X of device coordinate system DC (e.g., feet L and R may define a X-axis of input coordinate system NC and may be aligned along a X-axis of device coordinate system DC with foot R further in the +X direction), and an axis Y of input coordinate system NC is aligned with axis Y of device coordinate system DC (e.g., with foot F further in the +Y direction closest to display screen 112s), and an axis Z of input coordinate system NC (e.g., axis IA) is aligned with a Z-axis of device coordinate system DC). Alternatively, as shown in FIGS. 2A-2F, input assembly 200 may be positioned with any other suitable second input orientation with respect to display screen 112s (e.g., housing 201 may be rotated 45° in the direction of arrow CW (clockwise) about axis Z of device coordinate system DC, whereby feet L and F may be equidistant from display screen 112s). Therefore, as shown in FIGS. 2A-2H, the second input orientation of assembly 200 and input coordinate system NC with respect to device 100 and device coordinate system DC may include input coordinate system NC of assembly 200 offset by 45° in the direction of arrow CW (e.g., about its Z-axis (e.g., axis IA)) from device coordinate system DC (e.g., axis X of input coordinate system NC is offset with axis X of device coordinate system DC by 45° in the direction of arrow CW and axis Y of input coordinate system NC is offset from axis Y of device coordinate system DC by 45° in the direction of arrow CW). However, it is to be understood that input assembly 200 may be positioned at any suitable orientation with respect to display screen 112s or any other portion of device 100 on surface 5 (e.g., input coordinate system NC may be oriented in any suitable orientation with respect to device coordinate system DC) and input assembly 200 may still provide a structure of a substantially consistent shape (e.g., absent feet F, R, B, and L) when viewed from any line of sight perpendicular to axis IA (e.g., as shown by the similarities between FIGS. 1A, 1B, 2A, and 2B). Therefore, no matter the orientation of input assembly 200 on surface 5 with respect to device 100 (or surface 5 or device coordinate system DC), user U may create any user orientation between a body part of user U and exterior surface 201s of dome structure 201d (e.g., about axis IA) and still feel the same shape of dome structure 201d.

Figure 1D:
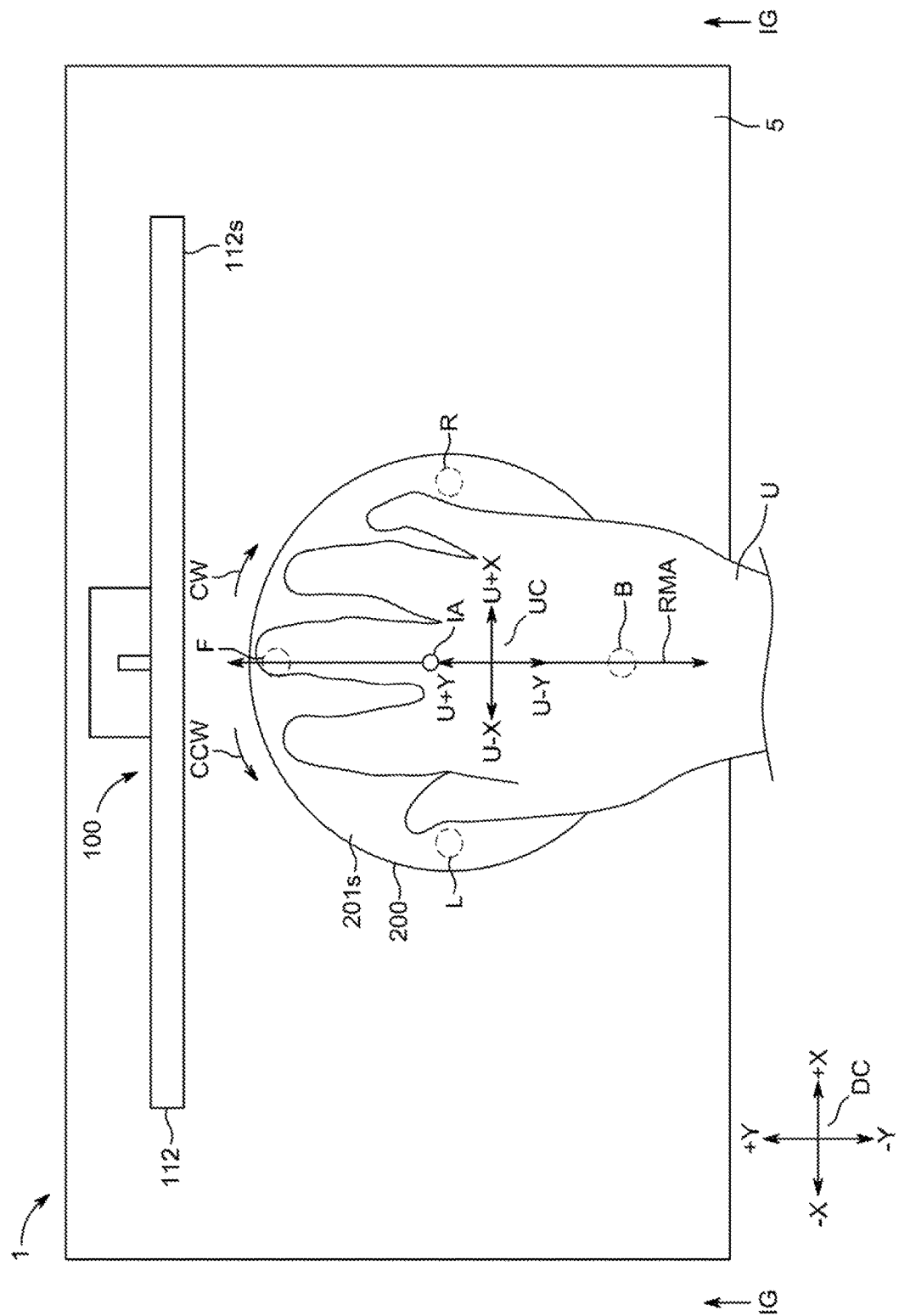
FIG. 1D is a top view of the system of FIGS. 1-1C with the input assembly interacting in the first assembly orientation with the electronic device and with a user interacting in a first user orientation with the input assembly.
Figure 1E:
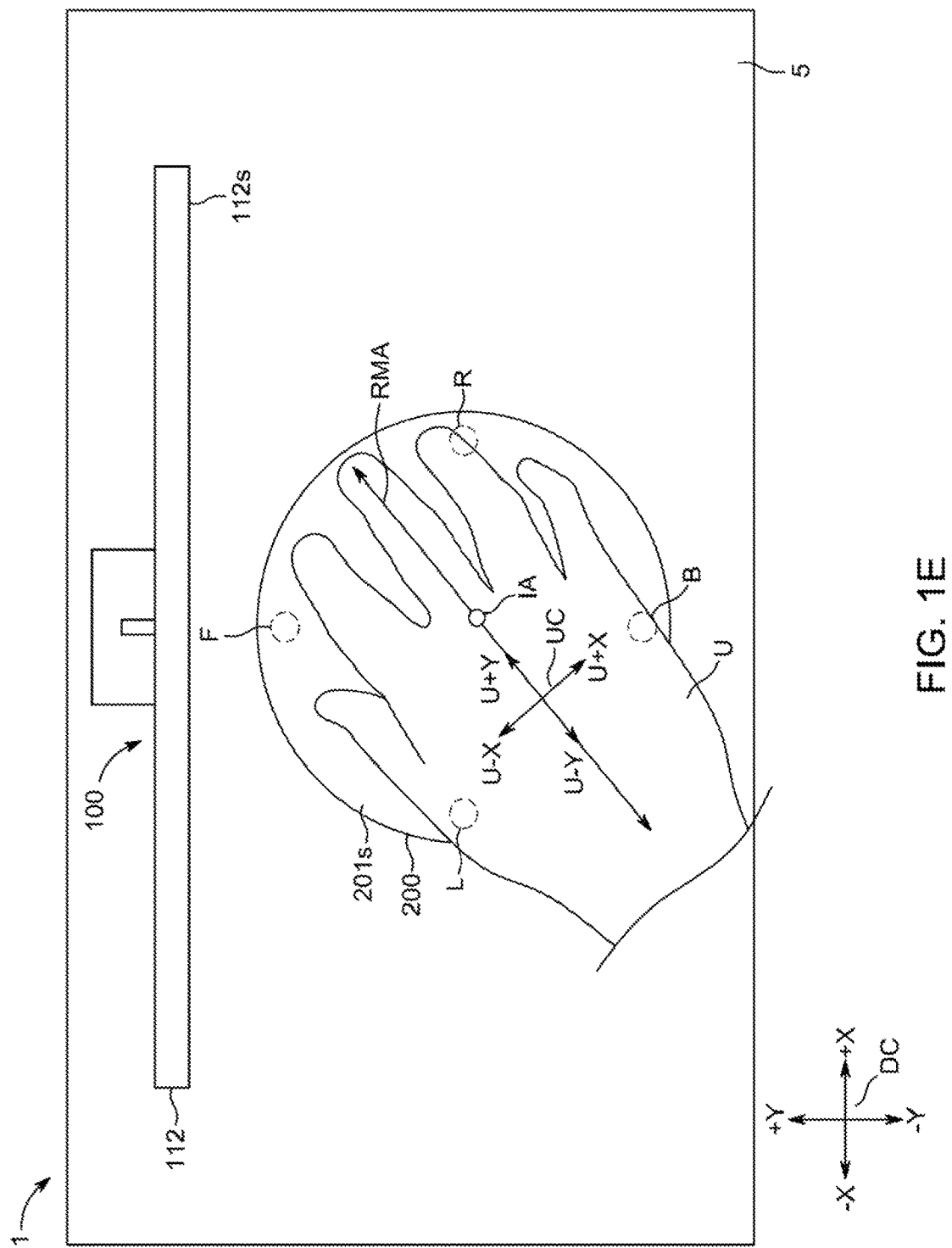
FIG. 1E is a top view of the system of FIGS. 1-1D with the input assembly interacting in the first assembly orientation with the electronic device and with the user interacting in a second user orientation with the input assembly.
Figure 1F:
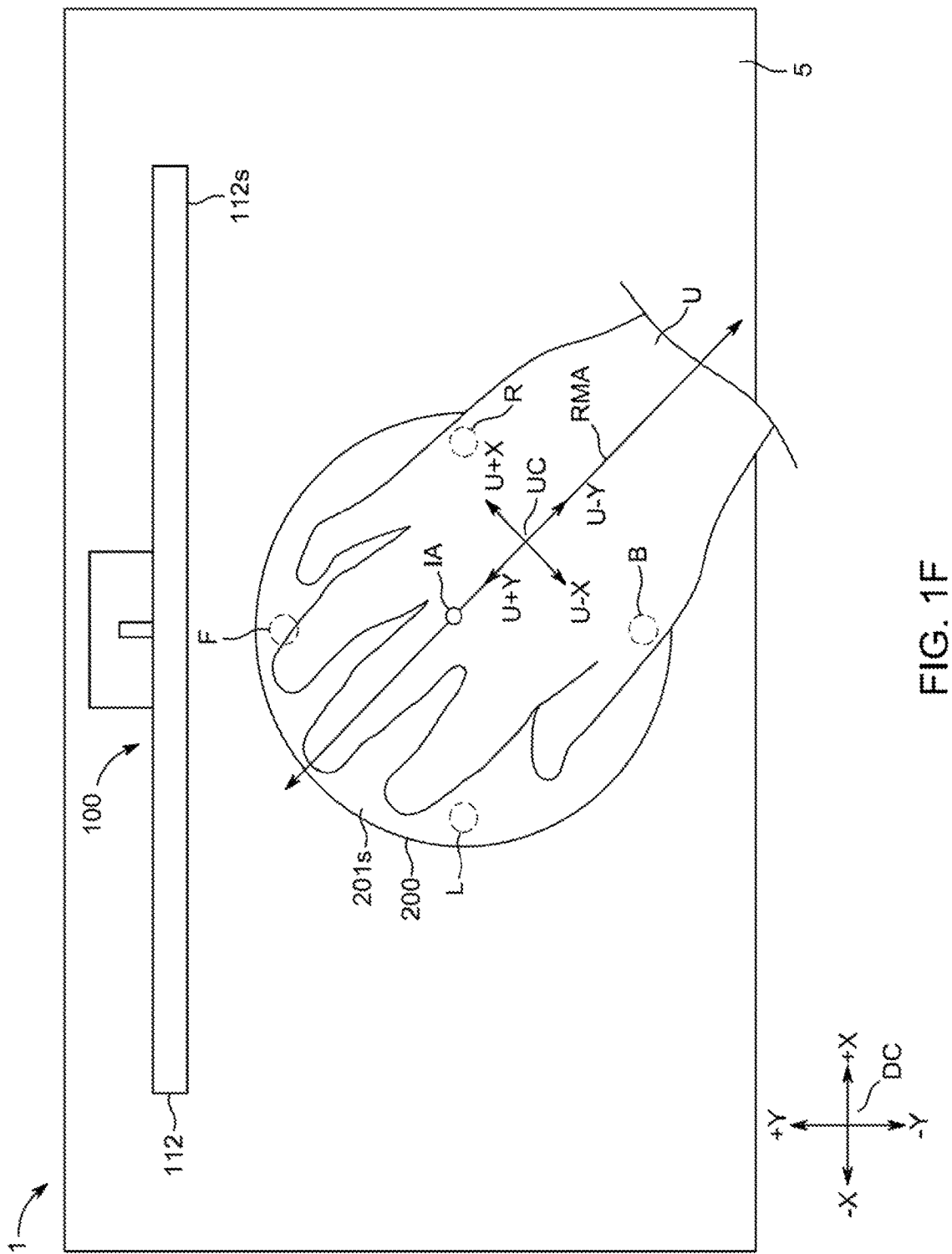
FIG. 1F is a top view of the system of FIGS. 1-1E with the input assembly interacting in the first assembly orientation with the electronic device and with the user interacting in a third user orientation with the input assembly.
Figure 1H:
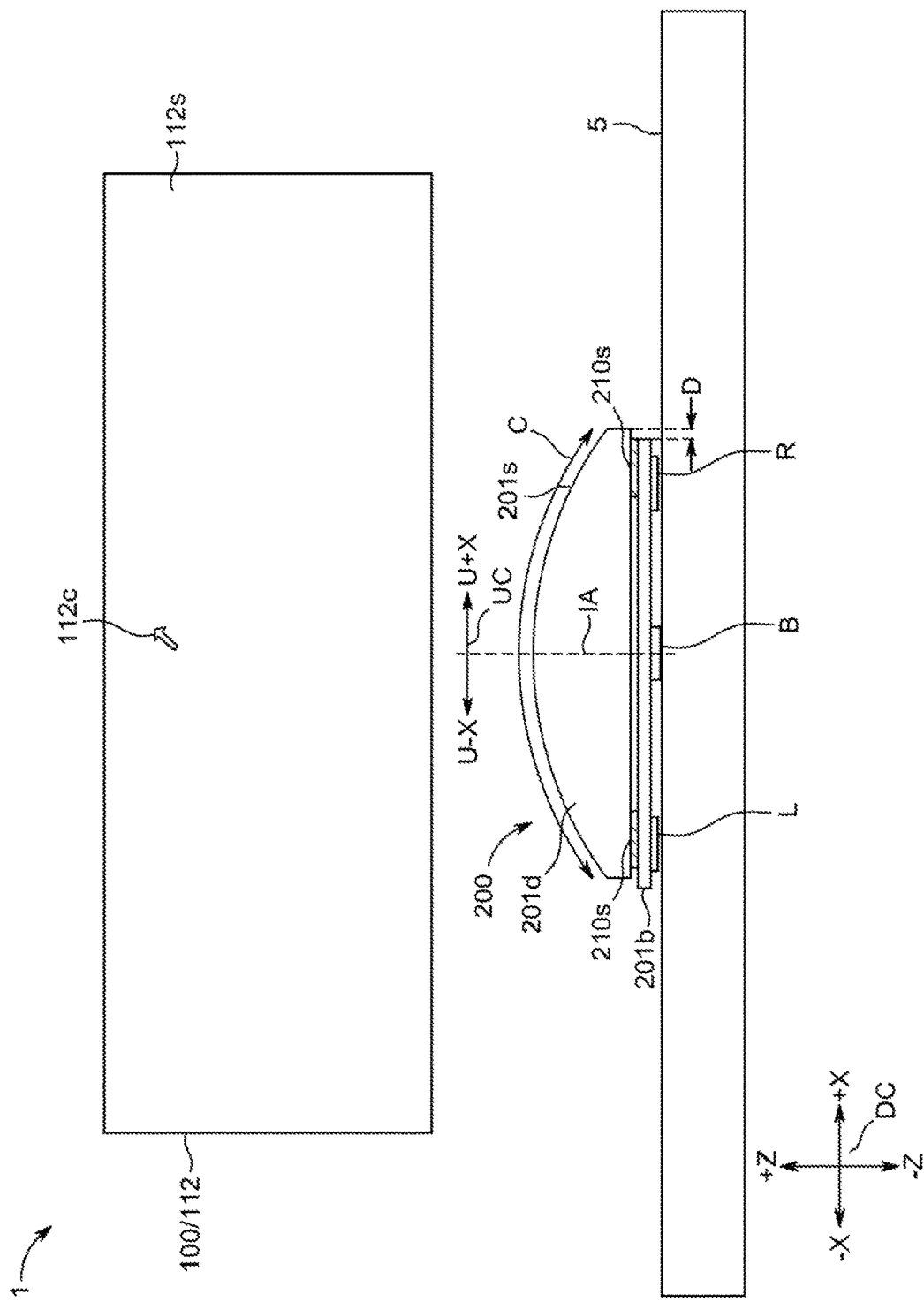
FIG. 1H is a front side view of the system of FIGS. 1-1G when the input assembly has been physically manipulated by the user.

For example, no matter whether user U positions its hand on top of exterior surface 201s of dome structure 201d at a first user orientation of FIG. 1D with respect to input assembly 200, at a second user orientation of FIG. 1E with respect to input assembly 200, or at a third user orientation of FIG. 1F with respect to input assembly 200, user U may feel the same or substantially similar structural shape of dome structure 201d. This may enable user U to "blindly" reach for and interact with input assembly 200, no matter the user orientation with input assembly 200, and still receive the same structural feedback from input assembly 200 (e.g., input assembly 200 may feel the same to user U no matter which of many various user orientations user U's hand may have with respect to input assembly 200). For example, as shown in FIG. 1D, the first user orientation may include user U's right hand positioned on top of exterior surface 201s such that a right middle finger axis RMA of user U's right middle finger may be axially aligned with feet F and B of input assembly 200 and, thus, with axis Y of input coordinate system NC and, thus, with axis Y of device coordinate system DC due to the first orientation of assembly 200 and system NC with respect to device 100 and system DC. Axis RMA may be operative to define a Y-axis of a user coordinate system UC (e.g., between U−Y and U+Y), which may include an X-Y plane substantially parallel to surface 5. Therefore, in FIG. 1D, the first user orientation may include user coordinate system UC of user U's right hand aligned with device coordinate system DC (e.g., axis X of user coordinate system UC (e.g., between U−X and U+X) is aligned with axis X of device coordinate system DC and axis Y of user coordinate system UC is aligned with axis Y of device coordinate system DC) and with input coordinate system NC. As shown in FIG. 1E, the second user orientation may include user U's right hand positioned on top of exterior surface 201s such that right middle finger axis RMA may be axially offset by 45° in the direction of arrow CW from a line extending through feet F and B of input assembly 200 and, thus, axially offset by 45° in the direction of arrow CW with axis Y of each one of device coordinate system DC and input coordinate system NC. Therefore, in FIG. 1E, the second user orientation may include user coordinate system UC of user U's right hand offset by 45° in the direction of arrow CW from input coordinate system NC and from device coordinate system DC (e.g., axis X of user coordinate system UC is offset by 45° in the direction of arrow CW from axis X of device coordinate system DC and axis Y of user coordinate system UC is offset by 45° in the direction of arrow CW from with axis Y of device coordinate system DC). While, as shown in FIG. 1F, the third user orientation may include user U's right hand positioned on top of exterior surface 201s such that right middle finger axis RMA may be axially offset by 45° in the direction of arrow CCW (counter clockwise) from a line extending through feet F and B of input assembly 200 and, thus, axially offset by 45° in the direction of arrow CCW with axis Y of each one of device coordinate system DC and input coordinate system NC. Therefore, in FIG. 1F, the second user orientation may include user coordinate system UC of user U's right hand offset by 45° in the direction of arrow CCW from input coordinate system NC and from device coordinate system DC (e.g., axis X of user coordinate system UC is offset by 45° in the direction of arrow CCW from axis X of device coordinate system DC and axis Y of user coordinate system UC is offset by 45° in the direction of arrow CCW from with axis Y of device coordinate system DC). Yet, no matter which of these or any other similar user orientations user U's right hand may have with respect to the top of exterior surface 201s (e.g., with respect to axis IA), exterior surface 201s may feel the same to user U.

Figure 2C:
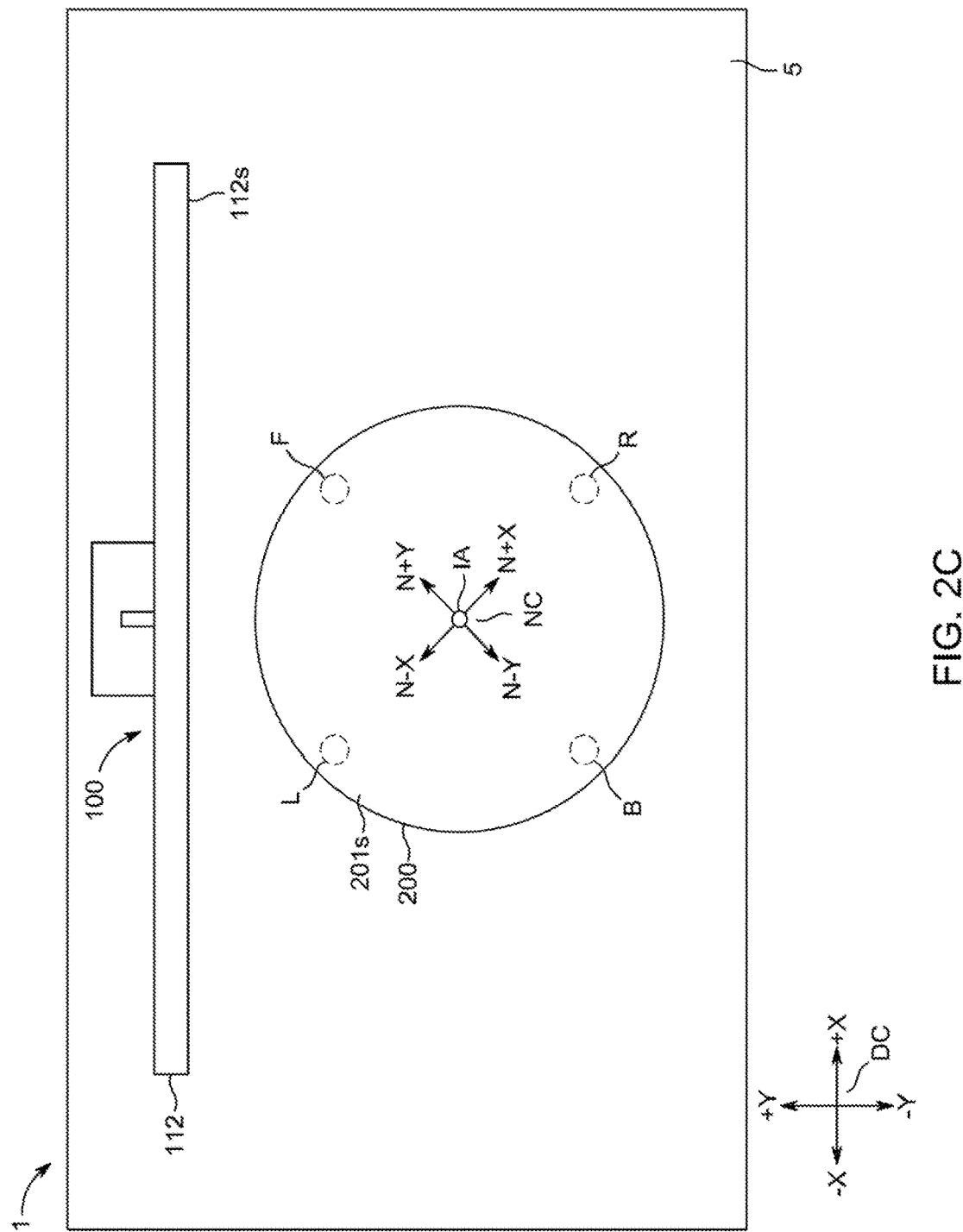
FIG. 2C is a top view of the system of FIGS. 1-2B with the input assembly interacting in the second assembly orientation with the electronic device.
Figure 2D:
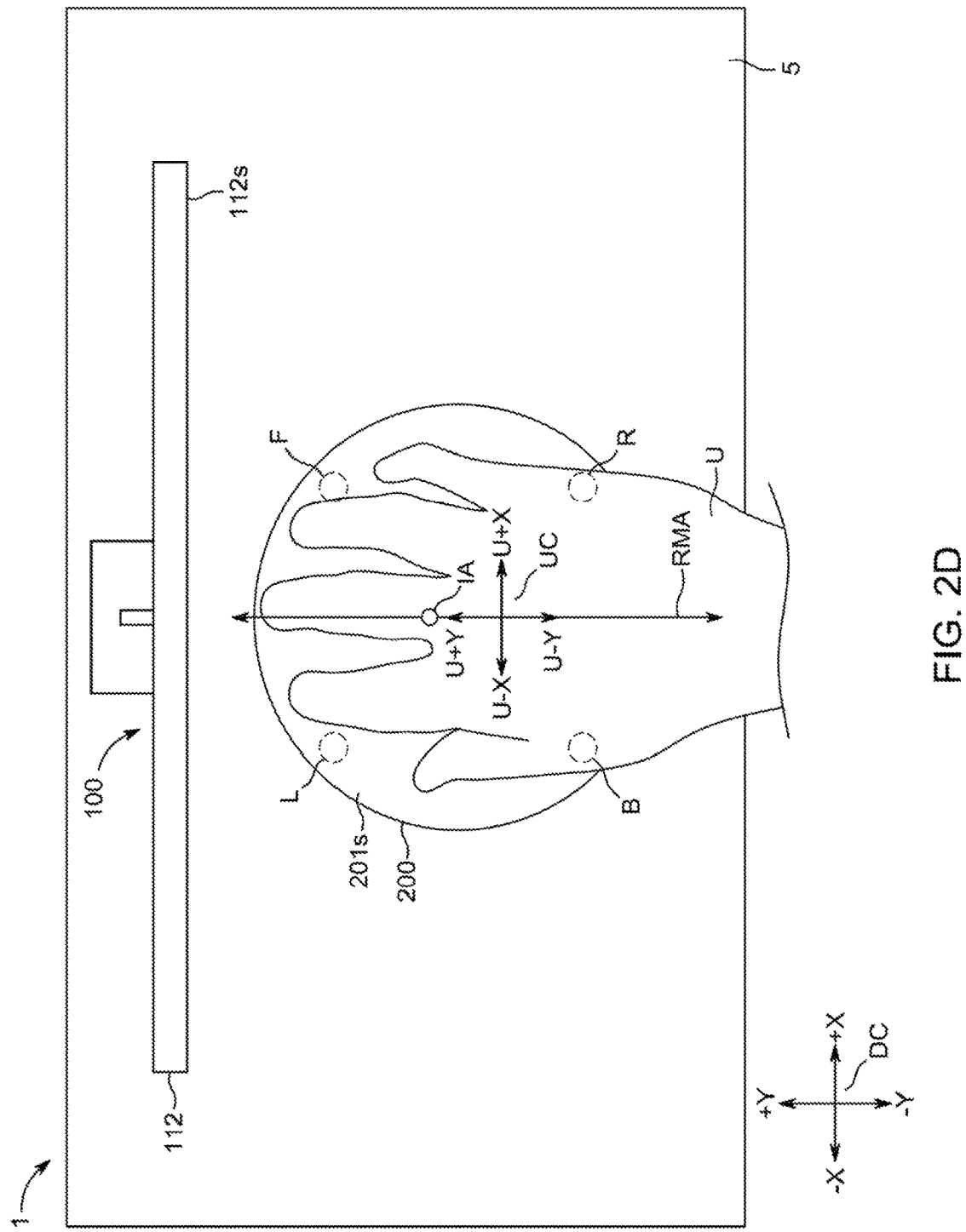
FIG. 2D is a top view of the system of FIGS. 1-2C with the input assembly interacting in the second assembly orientation with the electronic device and with the user interacting in a fourth user orientation with the input assembly.
Figure 2E:
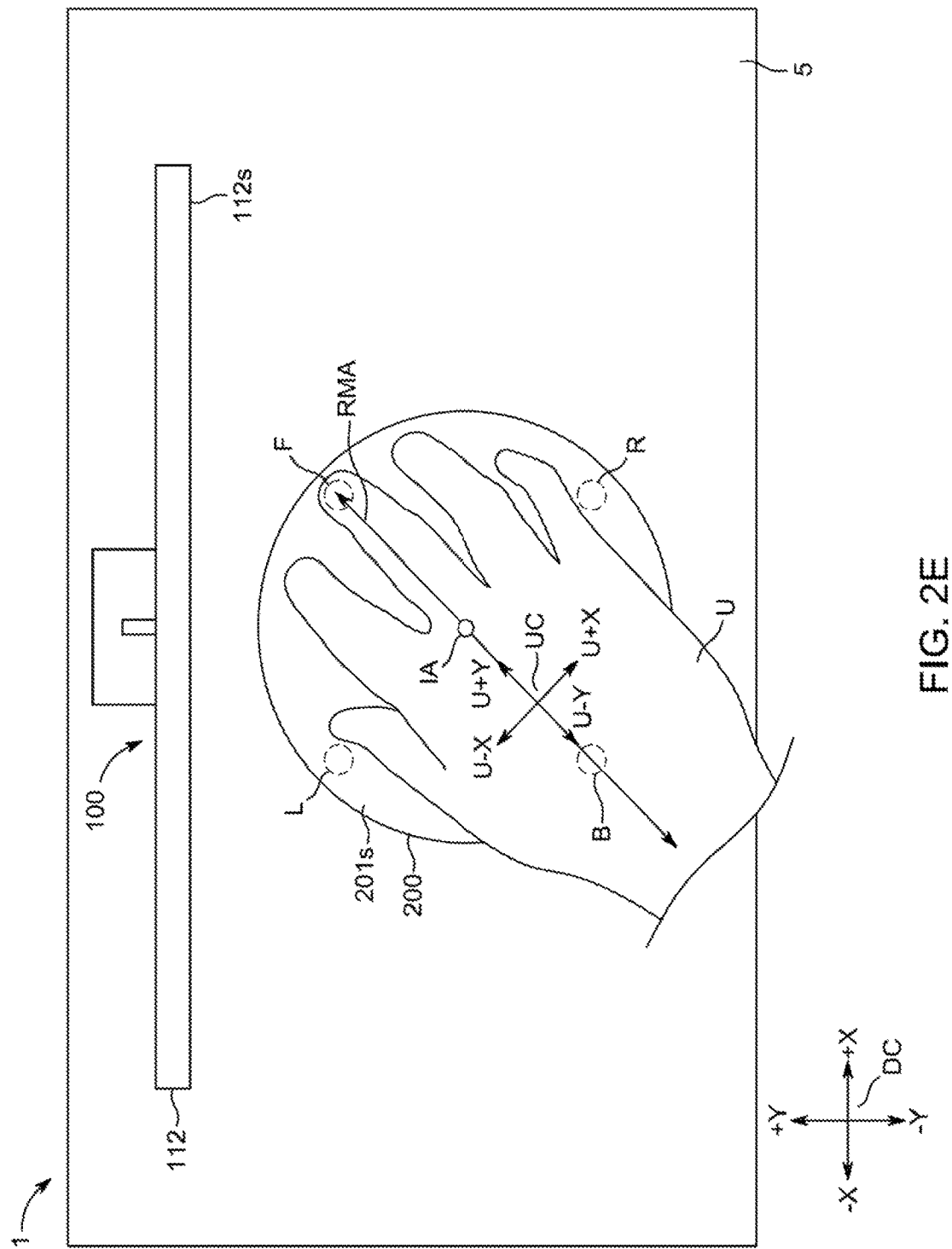
FIG. 2E is a top view of the system of FIGS. 1-2D with the input assembly interacting in the second assembly orientation with the electronic device and with the user interacting in a fifth user orientation with the input assembly.
Figure 2F:
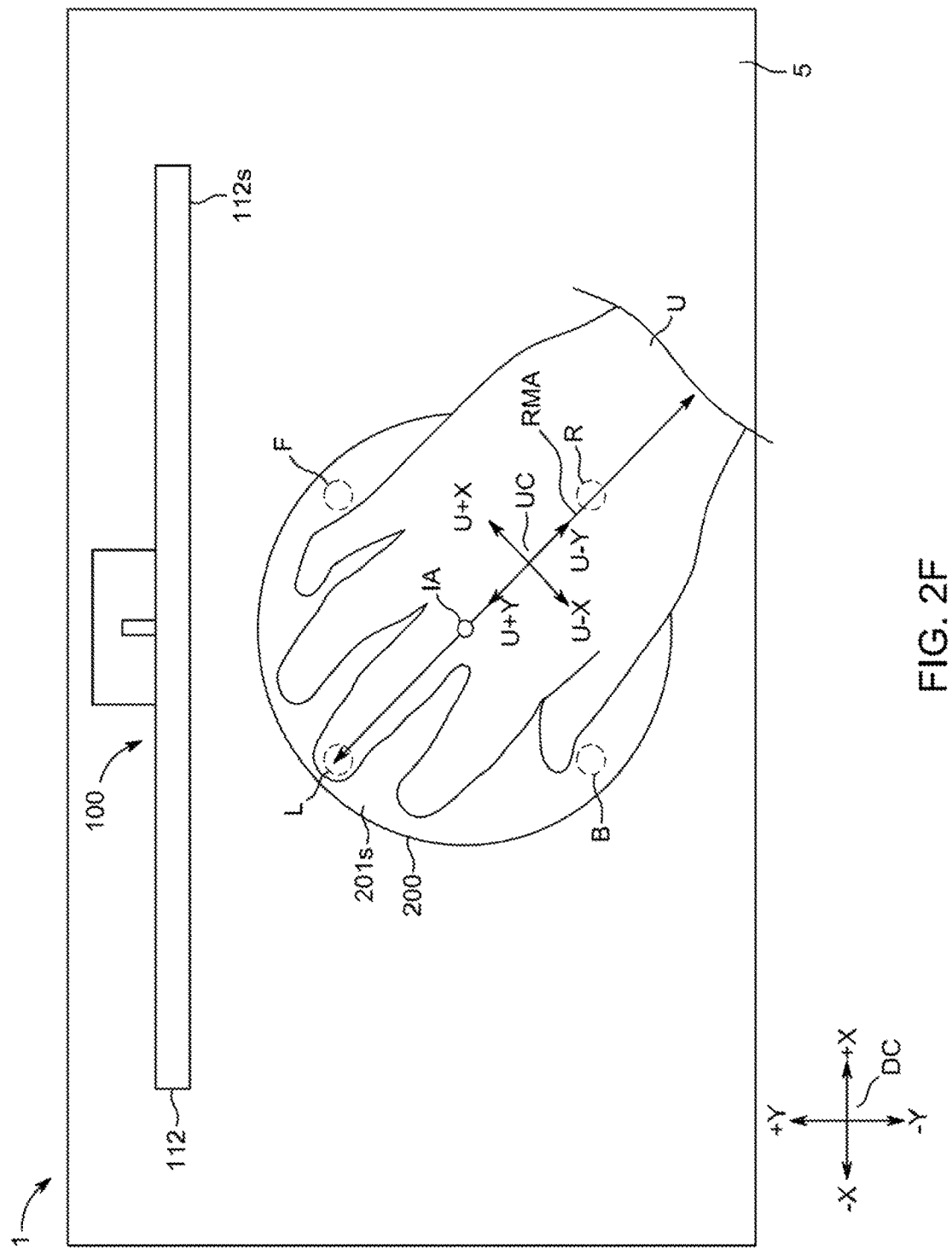
FIG. 2F is a top view of the system of FIGS. 1-2E with the input assembly interacting in the second assembly orientation with the electronic device and with the user interacting in a sixth user orientation with the input assembly.

As another example, no matter whether user U positions its hand on top of exterior surface 201s of dome structure 201d at a fourth user orientation of FIG. 2D with respect to input assembly 200, at a fifth user orientation of FIG. 2E with respect to input assembly 200, or at a sixth user orientation of FIG. 2F with respect to input assembly 200, user U may feel the same or substantially similar structural shape of dome structure 201d. This may enable user U to "blindly" reach for and interact with input assembly 200, no matter the user orientation with input assembly 200 and no matter the orientation of input assembly 200 to device 100, and still receive the same structural feedback from input assembly 200 (e.g., input assembly 200 may feel the same to user U no matter which of many various user orientations user U's hand may have with respect to input assembly 200). For example, as shown in FIG. 2D, the fourth user orientation may include user U's right hand positioned on top of exterior surface 201s such that the Y-axis of user coordinate system UC (e.g., right middle finger axis RMA) may be axially offset by 45° in the direction of arrow CCW from the Y-axis of input coordinate system NC of input assembly 200 (e.g., a line extending through feet F and B) but axially aligned with axis Y of device coordinate system DC. As shown in FIG. 2E, the fifth user orientation may include user U's right hand positioned on top of exterior surface 201s such that the Y-axis of user coordinate system UC (e.g., right middle finger axis RMA) may be axially aligned with the Y-axis of input coordinate system NC of input assembly 200 (e.g., a line extending through feet F and B) but axially offset by 45° in the direction of arrow CW with axis Y of device coordinate system DC, while, as shown in FIG. 2F, the sixth user orientation may include user U's right hand positioned on top of exterior surface 201s such that the Y-axis of user coordinate system UC (e.g., right middle finger axis RMA) may be axially offset by 90° in the direction of arrow CCW from the Y-axis of input coordinate system NC of input assembly 200 but only axially offset by 45° in the direction of arrow CCW from the Y-axis of device coordinate system DC of device 100. Yet, no matter which of these or any other similar user orientations user U's right hand may have with respect to the top of exterior surface 201s (e.g., with respect to axis IA), exterior surface 201s may feel the same to user U. Therefore, in some embodiments, depending on a current orientation of input coordinate system NC of assembly 200 with respect to device coordinate system DC of device 100, a particular orientation of user coordinate system UC of user U with respect to input coordinate system NC of assembly 200 may be the same as or different than a particular orientation of user coordinate system UC of user U with respect to device coordinate system DC of device 100.

System 1 may be configured to determine a current user orientation of user U (e.g., of user coordinate system UC) with respect to assembly 200 (e.g., with respect to input coordinate system NC) using any suitable sensing components of system 1. For example, any suitable sensor input components 210 of assembly 200 (e.g., hover or near touch sensors or any suitable touch sensors that may be integrated into and/or under and/or about exterior surface 201s) may be operative to detect the orientation of one or more body parts (e.g., palm, hand, one or more fingers, etc.) of user U on top of (e.g., physically against or hovering above but not physically touching) exterior surface 201s to determine the orientation of user coordinate system UC of user U with respect to input coordinate system NC of assembly 200 (e.g., to determine the current user orientation of right middle finger axis RMA of user U's right hand and/or of a left middle finger axis of user U's left hand and/or of any other suitable feature or combination of features of any suitable interaction appendage of the user and/or of any suitable instrument used by the user to interact with surface 201s, with respect to the axis defined by feet F and B that may be operative to define the Y-axis of input coordinate system NC of assembly 200). For example, as described in commonly-assigned, co-pending U.S. Non-Provisional Patent Application Publication No. 2008/0297478, which is hereby incorporated by reference herein in its entirety, various sensors may be used to accurately determine a current relationship between a user's hand and a mouse (e.g., by comparing detected user features with baseline features). As another example, as described in commonly-assigned, co-pending U.S. Non-Provisional Patent Application Publication No. 2017/0038905, which is hereby incorporated by reference herein in its entirety, various sensors may be used to accurately determine a location of one or more fingers on a surface of a device. While any suitable user characteristic or characteristics may be identified in order to determine the current user orientation of user U with respect to input assembly 200 (e.g., spacing and/or orientation between finger tips, palm print, and/or the like (e.g., average direction of each detected finger of a hand of a user with respect to any suitable dimension of assembly 200)), identification of a middle finger (e.g., right middle finger axis RMA of user U for a right hand of a user) may enable identification of user coordinate system UC and may be referred to herein for determining a current user orientation of user U to input assembly 200. Such user orientation determination may then be used to map any detected physical manipulations of input assembly 200 by user U to particular commands that may appropriately control the user interface. In some embodiments, system 1 may be operative to determine axis RMA and, thus, to determine user coordinate system UC that may use axis RMA as its Y-axis. Then, system 1 may be operative to detect any user physical manipulations of input assembly 200 by the user with respect to determined user coordinate system UC, and then to consistently map such physical manipulations within user coordinate system UC to user interface manipulations within device coordinate system DC.

Determination of a current user orientation with respect to input assembly 200 (e.g., determination of a current orientation of user coordinate system UC of user U with respect to input coordinate system NC of assembly 200) may then be used to map particular user physical manipulations of input assembly 200 to particular types of control data 99 that may be communicated to device 100 for controlling device 100 (e.g., for controlling cursor 112c on screen 112s). This may enable consistent control data to be generated in response to a particular user physical gesture imparted by user U on input assembly 200 no matter what the orientation of input assembly 200 is to electronic device 100 (e.g., no matter the orientation of input coordinate system NC of assembly 200 with respect to device coordinate system DC of device 100) and/or no matter what the orientation of input assembly 200 is to user U (e.g., no matter the orientation of input coordinate system NC of assembly 200 with respect to user coordinate system UC of user U) and/or no matter what the orientation of user U is to electronic device 100 (e.g., no matter the orientation of user coordinate system UC of user U with respect to device coordinate system DC of device 100). Once user coordinate system UC may be determined by input assembly 200 for a current user position or a current user orientation of user U with respect to input assembly 200 (e.g., current orientation of user coordinate system UC with respect to input coordinate system NC), a physical manipulation of input assembly 200 as initiated by user U from that determined current user position or orientation may be detected with respect to the determined user coordinate system UC of that current user position and then that detected physical manipulation with respect to user coordinate system UC may be mapped to user interface manipulations with device coordinate system DC for generating the appropriate control data 99, no matter what the orientation is of system UC with respect to system NC. Such a process may yield consistent control data for the same physical manipulation of assembly 200 by a user with respect to a determined user coordinate system UC, no matter what the relationship between that user coordinate system UC and input coordinate system NC, and/or no matter what the relationship between that user coordinate system UC and device coordinate system DC, and/or no matter what the relationship between input coordinate system NC and device coordinate system DC.

Figure 3:
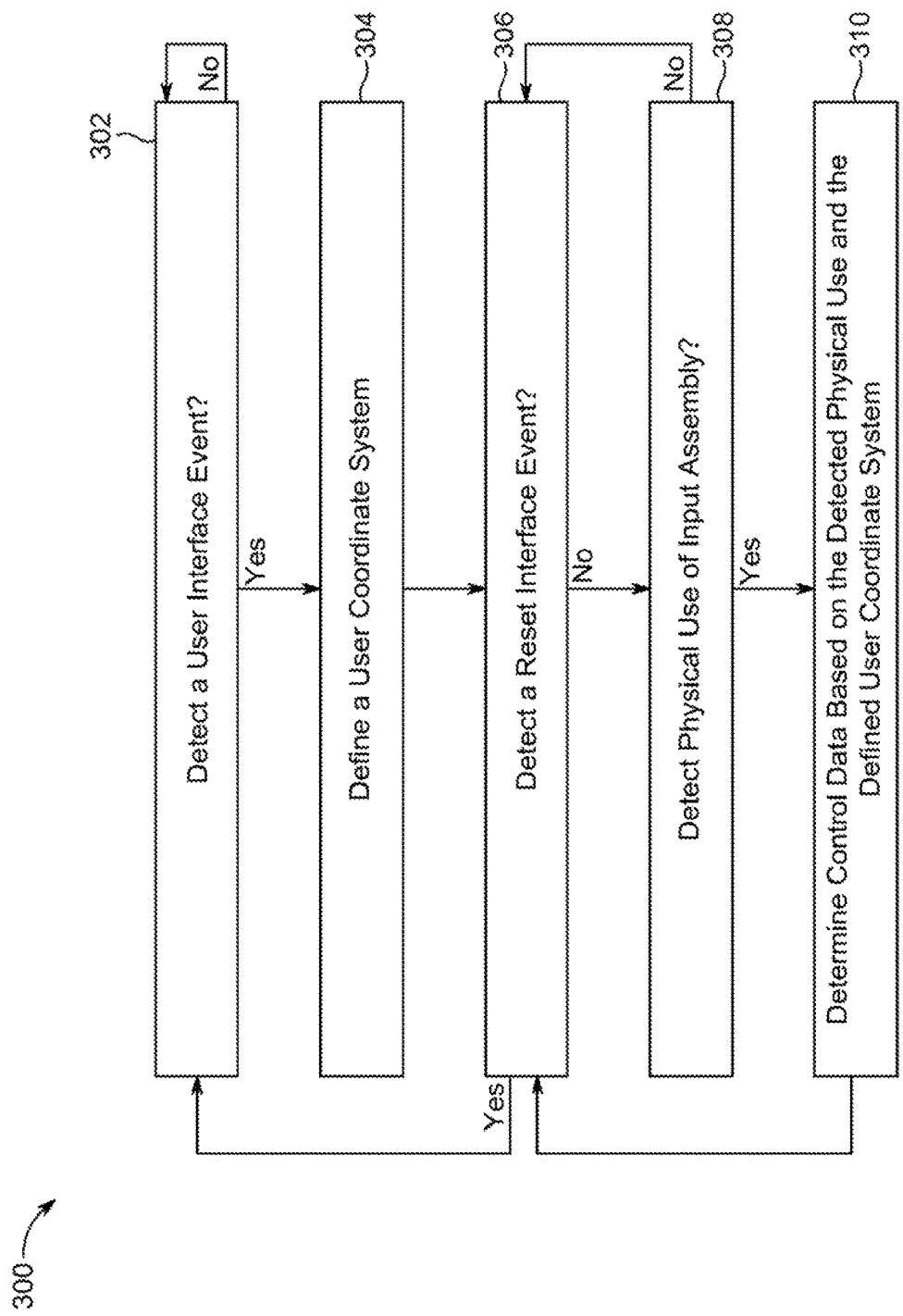
FIG. 3 is a flowchart of an illustrative process for using an input assembly to control an electronic device.

FIG. 3 is a flowchart of an illustrative process 300 for using an input assembly for controlling an electronic device, such as for using input assembly 200 for controlling electronic device 100. At operation 302 of process 300, the input assembly may determine whether a user interface event has been detected. If a user interface event is not detected at operation 302, then operation 302 may be repeated until a user interface event is detected or until any suitable interrupt of process 300 may be received. However, if a user interface event is detected at operation 302, then process 300 may advance to operation 304, where the input assembly may define a current user coordinate system based on the user interface event detected at operation 302. For example, any suitable type of interaction by a user with an input assembly may be detected as a user interface event at operation 302, including, but not limited to, detection of at least a portion of a user's hand in physical contact with any suitable surface (e.g., surface 201s) of the input assembly (e.g., instantaneous detection or detection of substantially consistent contact for a threshold period of time (e.g., 300 milliseconds, 500 milliseconds, etc.), etc.), detection of at least a portion of a user's hand hovering adjacent to (e.g., within a threshold distance of) but not contacting the input assembly (e.g., instantaneous detection or detection of substantially consistent hovering for a threshold period of time (e.g., 300 milliseconds, 500 milliseconds, etc.), etc.), and/or the like. For example, if a user's relationship with system 1 changed from that of FIG. 1C (e.g., at which no user contact or interaction may be detected with respect to stationary assembly 200) to that of FIG. 1D (e.g., at which a user's hand may be positioned over or on surface 201s of stationary assembly 200), then a user interface event may be detected (e.g., at operation 302) and system 1 may attempt to detect a current user coordinate system (e.g., system UC of FIG. 1D (e.g., at operation 304)). At operation 304, the input assembly may define a current user coordinate system, such as user coordinate system UC, based on the user interface event detected at operation 302. For example, detection of at least a user's middle finger in contact with surface 201s (e.g., consistent contact at a particular position for a particular threshold length of time) may be a user interface event detected at operation 302, and then an appropriate user coordinate system UC may be defined by the input assembly at operation 304 based on that detected position of the user's middle finger. As mentioned, a relationship between the current input coordinate system NC of input assembly 200 at operation 304 and the current orientation of the user U with respect to that system NC as may be used to define user coordinate system UC of user U at operation 304 may be any suitable relationship (e.g., aligned, offset about axis IA by 45°, offset about axis IA by 90°, etc. (e.g., one of at least 3 possible user coordinate systems (e.g., one of at least 360 possible user coordinate systems (e.g., one for each degree of rotation about axis IA))), and variations in that relationship may not vary the control data eventually generated by process 300. However, the relationship between current input coordinate system NC of input assembly 200 at operation 304 and the current user coordinate system UC at operation 304 may be utilized internally by input assembly 200 to track movement of the user with respect to input assembly 200.

After a current user coordinate system has been defined at operation 304, process 300 may advance to operation 306, where the input assembly may determine whether a reset interface event has been detected. If a reset interface event is detected at operation 306, then process 300 may return to operation 302 until a user interface event is detected or until any suitable interrupt of process 300 may be received. For example, if a reset interface event is detected, process 300 may return to operation 302 or operation 304 to potentially define a new current user coordinate system. However, if a reset interface event is not detected at operation 306, then process 300 may advance to operation 308, where the input assembly may determine whether any physical use of the input assembly has been detected. For example, any suitable type of interaction by a user with an input assembly may be detected as a reset interface event at operation 306, including, but not limited to, detection of at least a portion or the entirety of a user's hand terminating physical contact with any suitable surface (e.g., surface 201s) of the input assembly (e.g., instantaneous detection of no contact or detection of consistent lack of contact for a threshold period of time (e.g., 300 milliseconds, 500 milliseconds, etc.), etc.), detection of no movement of a user's hand or of at least a portion of a user's hand for at least a threshold period of time (e.g., no detected movement of a user's hand along surface 201s that is contacting surface 201s), and/or the like. For example, if a user's relationship with system 1 changed from that of FIG. 1D (e.g., at which a first current user coordinate system UC may be defined as shown) to that of FIG. 1C (e.g., at which no user contact or interaction may be detected), then a reset event may be detected (e.g., at operation 306) and system 1 may attempt to detect a new user interface event (e.g., at operation 302). As another example, if a user's relationship with system 1 changed from that of FIG. 1D (e.g., at which a first current user coordinate system UC may be defined as shown) to that of FIG. 1E and then the user did not move from the position of FIG. 1F for a particular period of time, then a reset event may be detected (e.g., at operation 306) and system 1 may attempt to detect a new user interface event (e.g., at operation 302), which may be immediately detected due to the user's current interaction with assembly 200, such that a second current user coordinate system UC may then be defined to be the system UC of FIG. 1E (e.g., at operation 304).

If a reset interface event is not detected at operation 306, then process 300 may advance to operation 308, where the input assembly may determine whether any physical use of the input assembly has been detected. If no physical use of the input assembly is detected at operation 308, then process 300 may return to operation 306 to determine if any reset interface event may be detected. However, if any physical use of the input assembly is detected at operation 308, then process 300 may advance to operation 310, where appropriate control data may be determined based on the physical use detected at operation 308 and based on the current user coordinate system defined at operation 304, where such control data may be used to control the operation of any suitable electronic device (e.g., device 100), where such control data may be generated by the input assembly and/or by the electronic device. Any suitable physical use may be detected at operation 308, such as physical movement of input assembly 200 with respect to ("w/r/t") or along work surface 5 (e.g., any movement of assembly 200 along any path along surface 5 or any rotation of the entirety of assembly 200 about axis IA), movement of a portion of user U (e.g., a finger tip or multiple finger tips) along surface 201s of assembly 200, tapping or force pressing by a portion of user U (e.g., a finger tip or multiple finger tips) downward into surface 201s of assembly 200, movement of a portion of input assembly 200 (e.g., rotation of dome structure 201d with respect to base structure 201b, axial shear force of dome structure 201d with respect to base structure 201b, etc.), and/or the like.

It is understood that the operations shown in process 300 of FIG. 3 are only illustrative and that existing operations may be modified or omitted, additional operations may be added, and the order of certain operations may be altered.

Application 203 of input assembly 200 and/or application 103 of electronic device 100 may be developed to include a rule system, such as a rule system that may be at least partially represented by media rule system Table 1 provided below, that may include various rules, where each rule may be associated with a particular control action and with a particular type of physical use defined with respect to a particular current user coordinate system. For example, as shown in Table 1, each one of rules R1-R12 may be associated with or be defined to include a particular type of physical use (e.g., as may be detected at operation 308) defined with respect to a current user coordinate system UC (e.g., as may be defined at operation 304) and a particular control action that may be used to define particular control data (e.g., control data to be determined at operation 310), where such control data may be used by device 100 (e.g., by processor 102) to carry out the particular control action defined by the control data.

device 100), then control data may be determined that may be operative to instruct device 100 to correspondingly move cursor 112c along screen 112s in the −Z direction of device coordinate system DC).

As a particular user physical manipulation of input assembly 200 by user U may be detected by system 1 in the context of a determined user coordinate system UC of a current user orientation with respect to input assembly 200, one or more sensors or applications or processors or otherwise of assembly 200 may be operative to be recalibrated or mapped based on the current determined user coordinate system UC to detect user physical manipulation within that user coordinate system UC. This may enable different types of movement of assembly 200 with respect to input coordinate system NC to result in the same control data when those different types of movement are the result of the same type of movement with

TABLE 1

| Rule | Physical Use w/r/t User Coordinate System (UC) | Control Action |
| --- | --- | --- |
| R1 | Movement of Assembly w/r/t Work Surface in +X of UC | Move Cursor along +X of DC |
| R2 | Movement of Assembly w/r/t Work Surface in −X of UC | Move Cursor along −X of DC |
| R3 | Movement of Assembly w/r/t Work Surface in +Y of UC | Move Cursor along +Z of DC |
| R4 | Movement of Assembly w/r/t Work Surface in −Y of UC | Move Cursor along −Z of DC |
| R5 | Rotation of User w/r/t Assembly Surface in CW of UC | Rotate Cursor CW |
| R6 | Rotation of User w/r/t Assembly Surface in CCW of UC | Rotate Cursor CCW |
| R7 | Movement of User w/r/t Assembly Surface in +Y of UC | Make Cursor bigger |
| R8 | Movement of User w/r/t Assembly Surface in −Y of UC | Make Cursor smaller |
| R9 | Rotation of Assembly w/r/t Work Surface in CW of UC | Make Cursor Brighter |
| R10 | Rotation of Assembly w/r/t Work Surface in CCW of UC | Make Cursor Darker |
| R11 | Movement of Assembly Portion in +X of UC | Bounce Cursor along +X of DC |
| R12 | Movement of Assembly Portion in −X of UC | Bounce Cursor along −X of DC |

As shown with by rules R1-R4 of Table 1, for example, system 1 may be configured to map the X-axis of user coordinate system UC to the X-axis of device coordinate system DC and the Y-axis of user coordinate system UC to the Z-axis of device coordinate system DC for detected physical use that involves movement of input assembly 200 along work surface 5. In such embodiments, a user physical manipulation of input assembly 200 in the U+X direction (e.g., as determined at operation 308) of a determined current user coordinate system UC (e.g., as determined at operation 304) may be mapped by rule R1 (e.g., at operation 310) to a user interface manipulation of device 100 in the +X direction of device coordinate system DC (e.g., when user U physically slides input assembly 200 along surface 5 in the U+X direction of a determined current user coordinate system UC of any one of FIGS. 1D-1F and 2D-2F (e.g., no matter the orientation of input assembly 200 to device 100, no matter the orientation of user U to input assembly 200, and/or no matter the orientation of user U to device 100), then control data may be determined that may be operative to instruct device 100 to correspondingly move cursor 112c along screen 112s in the +X direction of device coordinate system DC). As another example, in such embodiments, a user physical manipulation of input assembly 200 in the U-Y direction (e.g., as determined at operation 308) of a determined current user coordinate system UC (e.g., as determined at operation 304) may be mapped by Rule R4 (e.g., at operation 310) to a user interface manipulation of device 100 in the −Z direction of device coordinate system DC (e.g., when user U physically slides input assembly 200 along surface 5 in the U-Y direction of a determined current user coordinate system UC of any one of FIGS. 1D-1F and 2D-2F (e.g., no matter the orientation of input assembly 200 to device 100, no matter the orientation of user U to input assembly 200, and/or no matter the orientation of user U to respect to a current user coordinate system UC. For example, this may enable not only the movement of assembly 200 of FIG. 1D by user U in the +Y direction of coordinate system DC (e.g., in the U+Y direction of current determined user coordinate system UC for moving foot F closer to device 100 of FIG. 1D in the +Y direction of coordinate system DC) but also the movement of assembly 200 of FIG. 2F by user U in the −X/+Y direction of coordinate system DC (e.g., in the U+Y direction of current determined user coordinate system UC (e.g., in the −X direction of input coordinate system NC) for moving foot F slightly closer to device 100 of FIG. 2F in the −X/+Y direction of coordinate system DC) to control device 100 in the same manner (e.g., to move cursor 112c along screen 112s in the +Z direction of device coordinate system DC (e.g., Rule R3 of Table 1). Any suitable sensor input component(s) 210 may be used to sense user physical manipulation of input assembly 200 along surface 5, such as any suitable optical sensor(s), a track ball, or the like.

As another example, a user physical manipulation of input assembly 200 may be to physically move a body part of user U with respect to (e.g., along exterior surface 201s). For example, when the current user coordinate system has been defined (e.g., at operation 304) to be user coordinate system UC of FIG. 1D, and then user U physically rotates its right hand along exterior surface 201s of assembly 200 in the direction of arrow CW by 45° about axis IA from the orientation of FIG. 1D to the orientation of FIG. 1E (e.g., as may be detected at operation 308), such detected physical use may be mapped by rule R5 (e.g., at operation 310) to determine control data that may be operative to rotate an object selected by cursor 112c by 45° CW. Similarly, when the current user coordinate system has been defined (e.g., at operation 304) to be user coordinate system UC of FIG. 2D, and then user U physically rotates its right hand along exterior surface 201s of assembly 200 in the direction of arrow CW by 45° about axis IA from the orientation of FIG. 2D to the orientation of FIG. 2E (e.g., as may be detected at operation 308), such detected physical use may be mapped by rule R5 (e.g., at operation 310) to determine control data that may be operative to rotate an object selected by cursor 112c by 45° CW. Similarly, when the current user coordinate system has been defined (e.g., at operation 304) to be user coordinate system UC of FIG. 2F, and then user U physically rotates its right hand along exterior surface 201s of assembly 200 in the direction of arrow CW by 45° about axis IA from the orientation of FIG. 2F to the orientation of FIG. 2D (e.g., as may be detected at operation 308), such detected physical use may be mapped by rule R5 (e.g., at operation 310) to determine control data that may be operative to rotate an object selected by cursor 112c by 45° CW. Therefore, each one of these three exemplary rotations of user U by 45° CW with respect to surface 201s of assembly 200 may result in the same control data being determined by process 300 (e.g., control data that may be operative to rotate an object selected by cursor 112c by 45° CW), despite each one of the three exemplary rotations having a differently defined current user coordinate system UC (e.g., UC of FIG. 1D, UC of FIG. 2D, and UC of FIG. 2F, respectively), and despite each one of those three differently defined current user coordinate systems UC having a different relationship with device coordinate system DC and/or with input coordinate system NC than one or each of the other differently defined current user coordinate systems UC. For example, system UC of FIG. 1D and system UC of FIG. 2D have the same relationship with system DC (e.g., X-axes aligned), but system UC of FIG. 1D has a different relationship with system NC (e.g., X- and Y-axes aligned) than system UC of FIG. 2D has with system NC (e.g., X- and Y-axes not aligned). As another example, system UC of FIG. 1D has a different relationship with system DC (e.g., X-axes aligned) than system UC of FIG. 2F has with system DC (e.g., X- and Y-axes not aligned), and system UC of FIG. 1D has a different relationship with system NC (e.g., X- and Y-axes aligned) than system UC of FIG. 2F has with system NC (e.g., Y-axis of UC aligned with X-axis of NC), and system NC of FIG. 1D has a different relationship with system DC (e.g., X- and Y-axes aligned) than system NC of FIG. 2F has with system DC (e.g., X- and Y-axes not aligned).

For example, user U may physically rotate its right hand along exterior surface 201s in the direction of arrow CW by 45° about axis IA from the orientation of FIG. 1D to the orientation of FIG. 1E, where the current user orientation of axis RMA of user U may rotate with respect to assembly 200 (e.g., axis RMA may rotate from being aligned with feet F and B at FIG. 1D to being offset between feet F and R of FIG. 1E (e.g., system UC may rotate with respect to system NC in the direction of arrow CW by 45°, yet system 1 (e.g., one or more motion sensor input components 210 or touch sensor (e.g., multi-touch) sensor input components 210 of assembly 200) may be operative to detect the movement of user U along exterior surface 201s with respect to the initial current determined user coordinate system UC of FIG. 1D to detect the 45° CW rotation and may be operative to generate particular command data 99 for controlling an interface of device 100 in a particular manner (e.g., rotate an object selected by cursor 112c by 45° CW) (e.g., the control action of Rule 5). Similarly, user U may physically rotate its right hand along exterior surface 201s in the direction of arrow CW by 45° about axis IA from the orientation of FIG. 2F to the orientation of FIG. 2D, where the current user orientation of axis RMA of user U may rotate with respect to assembly 200 (e.g., axis RMA may rotate from being aligned with feet L and R at FIG. 2F to being offset between feet L and F of FIG. 2D (e.g., system UC may rotate with respect to system NC in the direction of arrow CW by)) 45°, yet system 1 (e.g., one or more motion sensor input components 210 or touch sensor (e.g., multi-touch) sensor input components 210 of assembly 200) may be operative to detect the movement of user U along exterior surface 201s with respect to the initial current determined user coordinate system UC of FIG. 2F to detect the 45° CW rotation and may be operative to generate particular command data 99 for controlling an interface of device 100 in a particular manner (e.g., rotate an object selected by cursor 112c by 45° CW) (e.g., the control action of Rule 5), which may be the same as the particular manner based on user physical manipulation between FIGS. 1D and 1E, as the same rotation of user U with respect to exterior surface 201s occurred despite the orientation of user U to device 100 not being the same between the two physical manipulations. In such embodiments, the initial current determined user coordinate system UC (e.g., of FIG. 1D or of FIG. 2F) may be used for providing context to the entire physical manipulation (e.g., rotation) of user U with respect to exterior surface 201s (e.g., rather than updating the determined user coordinate system UC). Therefore, in some embodiments, once an initial current determined user coordinate system UC may be determined by system 1, that same determined user coordinate system UC may be used for providing context to any detected user physical manipulation, as long as one or more rules are followed (e.g., as long as user U does not completely break contact with assembly 200 during the manipulation or otherwise interact with assembly 200 in a manner that may cause system 1 to attempt to reset the current determined user coordinate system UC and determine a new user coordinate system UC (e.g., provide no movement for more than a particular threshold of time)).

As another example, a user physical manipulation of input assembly 200 may be to physically move a body part of user U with respect to (e.g., along exterior surface 201s) in a different manner (e.g., just a portion of a finger rather than all fingers and palm). For example, when the current user coordinate system has been defined (e.g., at operation 304) to be user coordinate system UC of FIG. 1D, and then user U physically flicks its middle finger along exterior surface 201s of assembly 200 in the +Y direction (e.g., in U+Y direction of system UC of FIG. 1D) (e.g., as may be detected at operation 308), such detected physical use may be mapped by rule R7 (e.g., at operation 310) to determine control data that may be operative to make cursor 112c bigger. Similarly, when the current user coordinate system has been defined (e.g., at operation 304) to be user coordinate system UC of FIG. 2D, and then user U physically flicks its middle finger along exterior surface 201s of assembly 200 in the +Y direction (e.g., in U+Y direction of system UC of FIG. 2D) (e.g., as may be detected at operation 308), such detected physical use may be mapped by rule R7 (e.g., at operation 310) to determine control data that may be operative to make cursor 112c bigger. Similarly, when the current user coordinate system has been defined (e.g., at operation 304) to be user coordinate system UC of FIG. 2F, and then user U physically flicks its middle finger along exterior surface 201s of assembly 200 in the +Y direction (e.g., in U+Y direction of system UC of FIG. 2F) (e.g., as may be detected at operation 308), such detected physical use may be mapped by rule R7 (e.g., at operation 310) to determine control data that may be operative to make cursor 112c bigger. Therefore, each one of these three exemplary flicks of a finger of user U along surface 201s of assembly 200 in the +Y direction of the current user coordinate system UC may result in the same control data being determined by process 300 (e.g., control data that may be operative to make cursor 112c bigger (e.g., control data based on action of Rule R7)), despite each one of the three exemplary finger flicks having a differently defined current user coordinate system UC (e.g., UC of FIG. 1D, UC of FIG. 2D, and UC of FIG. 2F, respectively), and despite each one of those three differently defined current user coordinate systems UC having a different relationship with device coordinate system DC and/or with input coordinate system NC than one or each of the other differently defined current user coordinate systems UC. For example, system UC of FIG. 1D and system UC of FIG. 2D have the same relationship with system DC (e.g., X-axes aligned), but system UC of FIG. 1D has a different relationship with system NC (e.g., X- and Y-axes aligned) than system UC of FIG. 2D has with system NC (e.g., X- and Y-axes not aligned). As another example, system UC of FIG. 1D has a different relationship with system DC (e.g., X-axes aligned) than system UC of FIG. 2F has with system DC (e.g., X- and Y-axes not aligned), and system UC of FIG. 1D has a different relationship with system NC (e.g., X- and Y-axes aligned) than system UC of FIG. 2F has with system NC (e.g., Y-axis of UC aligned with X-axis of NC), and system NC of FIG. 1D has a different relationship with system DC (e.g., X- and Y-axes aligned) than system NC of FIG. 2F has with system DC (e.g., X- and Y-axes not aligned).

As another example, a user physical manipulation of input assembly 200 may be to physically rotate housing 201 of assembly 200 about axis IA on surface 5. For example, user U may physically rotate assembly 200 in the direction of arrow CW by 45° about axis IA on surface 5 from the orientation of FIG. 1D to the orientation of FIG. 2E, where the current user orientation of axis RMA of user U may remain the same with respect to assembly 200 (e.g., axis RMA may remain aligned with feet F and B between the orientation of FIG. 1D and the orientation of FIG. 2E (e.g., the orientation of system UC to system NC may remain constant during rotation of assembly 200 by user U from FIG. 1D to FIG. 2E)), yet system 1 (e.g., one or more motion sensor input components 210 of assembly 200) may be operative to detect the rotation of assembly 200 and axis RMA of current determined user coordinate system UC about axis IA, and such detected 45° CW rotation may be operative to generate particular command data 99 for controlling an interface of device 100 in a particular manner (e.g., control data based on the action of Rule R9 (e.g., make cursor 112c brighter)). Similarly, user U may physically rotate assembly 200 in the direction of arrow CW by 45° about axis IA on surface 5 from the orientation of FIG. 1F to the orientation of FIG. 2D, where the current user orientation of axis RMA of user U may remain the same with respect to assembly 200 (e.g., axis RMA may remain aligned between feet L and F between the orientation of FIG. 1F and the orientation of FIG. 2D), yet system 1 (e.g., one or more motion sensor input components 210 of assembly 200) may be operative to detect the rotation of assembly 200 and axis RMA of current determined user coordinate system UC about axis IA, and such detected 45° CW rotation may be operative to generate particular command data 99 for controlling an interface of device 100 in a particular manner (e.g., control data based on the action of Rule R9 (e.g., make cursor 112c brighter)), which may be the same as the particular manner based on user physical manipulation between FIGS. 1D and 2E, as the same rotation of user U and assembly 200 occurred despite the orientation of user U to device 100 not being the same between the two physical manipulations (e.g., despite the orientation of system UC to system DC not being the same between the two physical manipulations) and despite the orientation of user U to assembly 200 not being the same between the two physical manipulations (e.g., despite the orientation of system UC to system NC not being the same between the two physical manipulations).

As another example, a user physical manipulation of input assembly 200 may be to physically move dome structure 201d with respect to base structure 201b. For example, a user physical manipulation of assembly 200 may move dome structure 201d in the U+X direction of a current determined user coordinate system UC with respect to base structure 201b from the position of FIG. 1G to the position of FIG. 1H by a distance D. Any suitable sensor input component(s) 210 of assembly 200 (e.g., any suitable shear force sensor(s) 210s (e.g., with haptic feedback), which may be provided between structures 201d and 201b) may be configured to detect such user physical manipulation in the context of current determined user coordinate system UC, and such user physical manipulation in the U+X direction of a current determined user coordinate system UC may be mapped to a user interface manipulation of device 100 in the +X direction of device coordinate system DC (e.g., when user U physically moves structure 201d with respect to structure 201b by distance D in the U+X direction of a determined current user coordinate system UC of any one of FIGS. 1D-1F and 2D-2F (i.e., no matter the orientation of input assembly 200 to device 100), then system 1 (e.g., assembly 200 and/or device 100) may be configured to generate and communicate control data 99 to device 100 that may be operative to instruct device 100 to correspondingly bounce (or otherwise manipulate) cursor 112c along screen 112s in the +X direction of device coordinate system DC by a distance proportional to distance D) (e.g., based on the action of Rule 11). Movement of structure 201d with respect to structure 201b may be enabled in any suitable directions (e.g., 2, 4, 8, 16, 32, or more directions with an X-Y plane of a user coordinate system UC), such that assembly 200 may be manipulated like an analog joystick controller.

Any suitable user physical interactions with respect to (e.g., any suitable physical use of) assembly 200 may be detected by system 1 (e.g., at operation 308) for controlling an interface of device 100 according to the concepts of this disclosure (e.g., for mapping (e.g., at operation 310) a user physical manipulation as detected (e.g., at operation 308) with respect to a determined user coordinate system UC (e.g., as defined at operation at 304) to a particular interface manipulation with respect to device coordinate system DC). For example, any suitable multi-touch sensor input component(s) 210 may be provided along dome exterior surface 201s to detect any suitable touch gestures by user U along exterior surface 201s (e.g., pinch to zoom between a thumb and index finger, full hand rotation (as mentioned above), scroll wheel by a single finger flicking motion (e.g., using a physical encoder or otherwise), scroll wheel by a single finger circular path motion (e.g., a circular dome shaped surface 201s may be more conducive to facilitating a circular finger motion than a flat surface), single or multi-finger clicks (e.g., each finger may be tapped on surface 201s and detected as that particular finger such that system 1 may be operative to associate with different finger clicks with different user control commands for device 100), two or three or four finger gestures (e.g., clicks or relative movement on surface 201s). Various touch sensor technologies may be used with a curved exterior surface 201s, such as capacitive touch sensor technologies (e.g., carbon nanobud, metal wire, metal mesh, conductive fabric, flexible circuitry (e.g., polyethylene terephthalate ("PET"), polyethylene naphthalate ("PEN"), polyimide ("PI"), etc.)), optical touch sensor technologies (e.g., frustrated total internal reflection ("FTIR") multi-touch technology, etc.), ultrasonic touch sensor technologies, and/or the like. Any suitable touch sensing may also be enabled to detect force (e.g., a magnitude of pressure or force exerted by a user at each touch event), such as in vertical, horizontal, and/or rotational axes with respect to surface 201s. Additionally or alternatively, any suitable optical sensor and/or inertial measurement unit ("IMU") sensor input component(s) 210 of assembly 200 may be operative to detect physical rotation of dome structure 201d with respect to base structure 201b (e.g., about axis IA), which may be operative to enable assembly 200 to be physically manipulated for use as a scroll wheel (e.g., physical encoder or otherwise). Any suitable haptic and/or audible and/or visual feedback may be provided by any suitable output component(s) 212 of assembly 200 to help user U confidently interact with system 1.

Therefore, such an assembly 200 with dome housing structure 201d may provide not only an ambidextrous design that may be similarly used by either the left or right hand of a user, but also an orientationless design (e.g., about axis IA) that may be similarly used by any hand at any user orientation with respect to any component(s) of assembly 200 (e.g., at any orientation of system UC of any hand with respect to system NC (e.g., any one of 3 or more (e.g., 360) such orientations)), while providing consistent and expected device control of device 100. By determining a current user orientation (e.g., out of three or more possible orientations (e.g., 360 orientations for 360° rotation of user U's hand about axis IA)) with respect to assembly 200 (e.g., by sensing the position of one or more body parts of a user (e.g., the position of one or more types of digits relative to one another) using heat sensing, touch sensing, comparisons to known user orientations, etc.) for defining a user coordinate system UC with respect to input coordinate system NC in which one or more user physical manipulations of assembly 200 by user U may then be detected, a particular user manipulation within user coordinate system UC may consistently control device 100 in the same manner despite that user coordinate system UC being able to have multiple orientations with respect to input coordinate system NC of assembly 200 and/or with respect to device coordinate system DC of device 100. This may provide intuitive user control while also providing an input assembly with a pleasing physical appearance that is naturally ergonomic (e.g., to a cupped palm of a user). It is also to be understood that assembly 200 may have any suitable size and/or shape, such as a flat rectangle, and may not necessarily be domed and/or orientationless with respect to one or more axes.

Regardless of how input coordinate system NC of assembly 200 may currently be oriented with respect to device coordinate system DC of device 100 when a current or initial or baseline user coordinate system UC of user U may be determined and defined (e.g., with respect to assembly 200), any particular physical manipulation of assembly 200 with respect to that defined user coordinate system UC may result in the same user control of device 100 (e.g., the same manipulation of cursor 112c).

Moreover, the processes described with respect to any aspects of the disclosure may each be implemented by software, but may also be implemented in hardware, firmware, or any combination of software, hardware, and firmware. They each may also be embodied as computer-readable code recorded on a computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices (e.g., memory 104 and/or memory 204 of FIG. 1). The computer-readable medium can also be distributed over network-coupled computer systems so that the computer readable code is stored and executed in a distributed fashion. For example, the computer-readable medium may be communicated from one electronic device to another electronic device using any suitable communications protocol (e.g., the computer-readable medium may be communicated to electronic device 100 via communications component 106 and/or assembly 200 via communications component 206). The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that each process may be enabled by any suitable software construct, firmware construct, one or more hardware components, or a combination thereof. For example, each process may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of program modules of system 1 may be of any suitable architecture.

Many alterations and modifications of the preferred embodiments will no doubt become apparent to a person of ordinary skill in the art after having read the foregoing description, it is to be understood that the particular embodiments shown and described by way of illustration are in no way intended to be considered limiting. Thus, references to the details of the described embodiments are not intended to limit their scope.

What is claimed is:

1. An input assembly for controlling an electronic device, the input assembly comprising:
    a housing comprising:
        a base structure; and
        a dome structure positioned above the base structure and providing an orientationless surface with respect to at least one axis of an input coordinate system of the input assembly;
    a sensor subassembly comprising a plurality of sensor input components at least partially protected by the housing; and
    a processor operative to:
        detect, with the sensor subassembly, a user coordinate system of a user with respect to the orientationless surface;
        detect, with the sensor subassembly, a physical use of the housing; and determine a control action for the electronic device based on the detected user coordinate system and the detected physical use, wherein the detected physical use comprises axial movement of the dome structure with respect to the base structure.

2. The input assembly of claim 1, wherein the processor is operative to detect the user coordinate system from at least three possible user coordinate systems of the user with respect to the orientationless surface.

3. The input assembly of claim 2, wherein each one of the at least three possible user coordinate systems has a different orientation with respect to the input coordinate system of the input assembly than the other ones of the at least three possible user coordinate systems.

4. A method for controlling an electronic device using an input assembly of a user, wherein the input assembly comprises a housing, a sensor subassembly, and a processor, the method comprising:
  detecting, with the sensor subassembly, a user interface event that comprises the user interfacing with the housing of the input assembly;
  based on the detecting the user interface event, defining, with the processor, a user coordinate system for the detected user interface event from a plurality of possible user coordinate systems;
  after the defining the user coordinate system, detecting, with the sensor subassembly, a physical use of the housing of the input assembly;
  based on both the defined user coordinate system and the detected physical use, determining, with the processor, control data that is operative to control the electronic device;
  after the detecting the physical use, detecting, with the sensor subassembly and the processor, a reset interface event;
  after the detecting the reset interface event, detecting, with the sensor subassembly, another user interface event that comprises the user interfacing with the housing of the input assembly; and
  based on the detecting the other user interface event, defining, with the processor, another user coordinate system for the detected other user interface event from the plurality of possible user coordinate systems, wherein the reset interface event comprises the user maintaining contact with the housing of the input assembly but not changing contact with the housing of the input assembly for longer than a threshold duration of time.

5. The method of claim 4, wherein the plurality of possible user coordinate systems comprises at least three possible user coordinate systems, each of which has a different orientation with respect to an input coordinate system of the input assembly.

6. The method of claim 4, further comprising:
  after the defining the other user coordinate system, detecting another physical use of the input assembly; and
  based on both the defined other user coordinate system and the detected other physical use, determining other control data that is operative to control the electronic device.

7. The method of claim 6, wherein the plurality of possible user coordinate systems comprises at least three possible user coordinate systems, each of which has a different orientation with respect to an input coordinate system of the input assembly.

8. The method of claim 7, wherein:
  the defined user coordinate system comprises a first possible user coordinate system of the at least three possible user coordinate systems that has a first orientation with respect to the input coordinate system of the input assembly;
  the defined other user coordinate system comprises a second possible user coordinate system of the at least three possible user coordinate systems that has a second orientation with respect to the input coordinate system of the input assembly; and
  the first orientation with respect to the input coordinate system of the input assembly is different than the second orientation with respect to the input coordinate system of the input assembly.

9. The method of claim 8, wherein:
  the defined user coordinate system shares at least one axis with the input coordinate system; and
  the defined other user coordinate system shares no axis with the input coordinate system.

10. The method of claim 8, wherein:
  the detected physical use has a first relationship to the input coordinate system;
  the detected other physical use has a second relationship to the input coordinate system; and
  the first relationship is different than the second relationship.

11. The method of claim 8, wherein the determined control data is the same as the determined other control data.

12. The method of claim 8, wherein:
  the detected physical use has a first relationship to the defined user coordinate system;
  the detected other physical use has a second relationship to the defined other user coordinate system; and
  the first relationship is the same as the second relationship.

13. The method of claim 12, wherein:
  the determined control data is operative to control the electronic device in a first manner;
  the determined other control data is operative to control the electronic device in a second manner; and
  the first manner is the same as the second manner.

14. The method of claim 12, wherein the detected physical use comprises movement of the input assembly along a work surface.

15. The method of claim 12, wherein the detected physical use comprises movement of a portion of the user along a portion of the input assembly.

16. The method of claim 4, wherein the detected user interface event comprises the user interfacing with an orientationless structure of the input assembly.

17. An input assembly for controlling an electronic device, the input assembly comprising:
  a housing providing a surface within an input coordinate system of the input assembly;
  a sensor subassembly at least partially protected by the housing; and
  a processor operative to:
    detect, with the sensor subassembly, a user coordinate system of a user with respect to the surface from at least three possible user coordinate systems, wherein each one of the at least three possible user coordinate systems has a different orientation with respect to the input coordinate system of the input assembly;
    after the detection of the user coordinate system, detect, with the sensor subassembly, a physical use of the housing;

determine a control action for the electronic device based on the user coordinate system and the physical use;

after the determination of the control action, detect, with the sensor subassembly, a reset event; and after the detection of the reset event, detect, with the sensor subassembly, another user coordinate system of the user with respect to the surface from the at least three possible user coordinate systems, wherein the reset event comprises the user maintaining static contact with the surface for longer than a particular duration of time.

* * * * *